US010252834B2

(12) United States Patent
Yourist

(10) Patent No.: US 10,252,834 B2
(45) Date of Patent: Apr. 9, 2019

(54) RIGID STRUCTURED POLYMER CONTAINER

(71) Applicant: Graham Packaging Company, L.P., York, PA (US)

(72) Inventor: Sheldon E. Yourist, York, PA (US)

(73) Assignee: Graham Packaging Company, L.P., York, PA (US)

(*) Notice: Subject to any disclaimer, the term of this patent is extended or adjusted under 35 U.S.C. 154(b) by 276 days.

(21) Appl. No.: 14/973,514

(22) Filed: Dec. 17, 2015

(65) Prior Publication Data

US 2016/0176574 A1 Jun. 23, 2016

Related U.S. Application Data

(60) Provisional application No. 62/095,536, filed on Dec. 22, 2014.

(51) Int. Cl.
*B65D 25/24* (2006.01)
*B65D 21/02* (2006.01)
(Continued)

(52) U.S. Cl.
CPC .......... *B65D 21/0215* (2013.01); *B29C 49/04* (2013.01); *B65D 1/20* (2013.01); *B65D 25/2826* (2013.01); *B29L 2031/712* (2013.01)

(58) Field of Classification Search
CPC ... B65D 1/12; B65D 1/18; B65D 1/20; B65D 1/40; B65D 85/00; B65D 21/0215;
(Continued)

(56) References Cited

U.S. PATENT DOCUMENTS 3,400,846 A 9/1968 Kelly
4,213,532 A * 7/1980 Eggert .................... H05K 5/06
206/504
(Continued)

FOREIGN PATENT DOCUMENTS

DE 202011052413 * 1/2012 ............ B65D 1/12
DE 202011052413 U1 1/2012

OTHER PUBLICATIONS

U.S. Appl. No. 29/492,243, filed May 29, 2014.
(Continued)

*Primary Examiner* — Fenn C Mathew
*Assistant Examiner* — Elizabeth J Volz
(74) *Attorney, Agent, or Firm* — Baker Botts L.L.P.

(57) ABSTRACT

Large format rigid structured polymer container includes a hollow main body portion. The hollow main body portion includes four corner column configurations. Each corner column configuration has a top end and a bottom end. The top end of each corner column configuration defines a top reference plane, and the bottom end of each corner column configuration defines a bottom reference plane. The hollow main body portion has first and second end walls, and first and second sidewalls. Each end wall extends between two adjacent corner column configurations along a transverse direction of the main body portion. Each sidewall extends between adjacent corner column configurations along a longitudinal direction of the main body portion. The container has a recessed top surface extending between the top ends of the four of corner column configurations, and a raised bottom surface extending between the bottom ends of the four corner column configurations.

27 Claims, 29 Drawing Sheets

(51) Int. Cl.
*B65D 25/28* (2006.01)
*B29C 49/04* (2006.01)
*B65D 1/20* (2006.01)
*B29L 31/00* (2006.01)

(58) Field of Classification Search
CPC ............ B65D 25/2826; B65D 25/2897; B65D 25/2882; B65D 23/10; B65D 23/102; B29C 49/04; B29L 2031/712; B29L 2031/7126; F16N 3/04
USPC ....... 215/214, 217, 223, 379, 382–385, 396, 215/398; 206/511, 509, 504, 503; 222/210, 212, 215; 220/200, 608, 601, 220/606, 669, 771
See application file for complete search history.

(56) References Cited

U.S. PATENT DOCUMENTS

| | | | |
|---|---|---|---|
| D277,552 S | 2/1985 | Kung | |
| D286,615 S | 11/1986 | Lyons | |
| 4,989,738 A * | 2/1991 | Thayer | B29C 49/22 215/373 |
| 5,114,028 A | 5/1992 | Ring | |
| 5,299,710 A * | 4/1994 | Welsch | B65D 23/00 215/382 |
| D371,967 S | 7/1996 | Miller | |
| D391,165 S | 2/1998 | Walker | |
| 5,794,818 A * | 8/1998 | Bromwell | B65D 11/10 220/684 |
| 6,029,858 A | 2/2000 | Srokose et al. | |
| D428,341 S | 7/2000 | Boutin | |
| D434,326 S | 11/2000 | Smorch | |
| D454,789 S | 3/2002 | Harvey et al. | |
| D573,885 S | 7/2008 | Considine et al. | |
| D631,358 S | 1/2011 | Voelker | |
| D662,825 S | 7/2012 | Murphy | |
| D670,170 S | 11/2012 | Voelker | |
| D687,712 S | 8/2013 | Juna et al. | |
| D751,913 S | 3/2016 | Seecof | |
| D767,401 S | 9/2016 | Yourist | |
| D767,992 S | 10/2016 | Hegarty | |
| 2007/0023384 A1 | 2/2007 | Janeczek | |
| 2007/0023385 A1 | 2/2007 | Janeczek | |
| 2007/0261983 A1 | 11/2007 | Flanagan-Kent et al. | |
| 2008/0073317 A1 | 3/2008 | Dygert et al. | |

OTHER PUBLICATIONS

U.S. Appl. No. 29/548,960, filed Dec. 17, 2015.
U.S. Appl. No. 29/548,963, filed Dec. 17, 2015.
U.S. Appl. No. 29/492,243, Feb. 29, 2016 Final Office Action.
U.S. Appl. No. 29/492,243, Jan. 22, 2016 Response to Non-Final Office Action.
U.S. Appl. No. 29/492,243, Oct. 23, 2015 Non-Final Office Action.
U.S. Appl. No. 29/492,243, May 25, 2016 Notice of Allowance.
U.S. Appl. No. 29/492,243, Apr. 29, 2016 Response after Final Office Action.
U.S. Appl. No. 29/492,243, Aug. 24, 2016 Issue Fee Payment.
U.S. Appl. No. 29/548,960, Dec. 1, 2016 Non-Final Office Action.
U.S. Appl. No. 29/548,963, Dec. 2, 2016 Non-Final Office Action.
International Search Report and Written Opinion dated Mar. 11, 2016 in International Application No. PCT/US15/66677.

* cited by examiner

RIGID STRUCTURED POLYMER CONTAINER

CROSS REFERENCE TO RELATED APPLICATIONS

This application claims priority to U.S. Provisional Application Ser. No. 62/095,536 filed Dec. 22, 2014, which is incorporated by reference herein in its entirety.

BACKGROUND

Field of the Disclosed Subject Matter

The present disclosed subject matter relates generally to plastic containers, for example a large format polymer container for packaging and storing liquids.

Description of Related Art

Many liquids, including edible oils, motor oils, agricultural chemicals, and the like, are often packaged, shipped, and stored in large format polymer containers. Furthermore, it is often desirable to dispense or otherwise pour the liquid contents from such large format polymer containers. However, such containers can be heavy, typically weighing 1100-1200 grams, or more, and can be expensive to manufacture. Such containers can also be difficult for a user to manipulate to pour the liquid therefrom. For example, large format polymer containers of conventional design can have unsuitably thin handles with seams, which can be uncomfortable on the hands of users manipulating the container.

Additionally, the large format polymer containers of conventional design can also cause the liquid to "glug" or abruptly fluctuate in flow when being poured. For example, as the container is tilted forward, the mouth or neck portion can generally be lowered below the liquid level in the container, thereby trapping the air in the container above the liquid. Unsuitable venting in the container can cause the flow of liquid out of the container to alternate with the flow of air therein, and thus can interrupt the continuous, smooth flow of liquid and produce a glugging or gulping action. The poured stream from the container can thus become difficult to control and can cause liquid to spill from the container.

Furthermore, it is often desirable to stack a plurality of large format polymer containers for shipping and storage. However, large format polymer containers often are unable to support a suitable load thereon, for example for stacking a plurality of similarly configured containers. The reduced or limited ability to stack several containers on top of each other can result in wasted space and inefficiency. It therefore is currently common practice to package large format containers individually in exterior cardboard boxes when stacking several containers on top of each other, which results in wasted space and materials, and increased costs.

As such, there is a continued need for a large format rigid structured polymer container with improved load strength, for example for stacking, yet being easy to manipulate, to prevent a glugging action from interfering with pouring fluid contents from the container.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a large format rigid structured polymer container having a hollow main body portion. The hollow main body portion includes a plurality of corner column configurations. Each corner column configuration has a top end and a bottom end. The top ends of the plurality of corner column configurations define a top reference plane, and the bottom ends of the plurality of corner column configurations define a bottom reference plane. The main body portion further includes first and second end walls. Each end wall extends between two adjacent corner column configurations along a transverse direction of the main body portion. The main body portion also has first and second sidewalls. Each sidewall extends between an adjacent pair of corner column configurations along a longitudinal direction of the main body portion. The container further has a recessed top surface extending between the top ends of the four corner column configurations, and a raised bottom surface extending between the bottom ends of the four corner column configurations.

As embodied herein, the top ends of each corner column configuration can have a planar top surface. Alternatively, the top end of each corner column configuration can have a stabilizing tab, and the bottom end of each corner column configuration can have a recess feature configured to receive the stabilizing tab of a substantially similar large format container in a stacked relationship. The stabilizing tab of each corner column configuration can have a tapered sidewall in side view to facilitate centering the recess feature of a substantially similar large format container in a stacked relationship. Additionally or alternatively, the stabilizing tab at the top of each corner column configuration can have a partial circular shape in plan view. As embodied herein, each corner column configuration can define a partial cylindrical shape. The corner column configurations are designed to support the weight of similarly configured containers stacked above.

Additionally, and as embodied herein, each end wall can extend tangentially between adjacent corner column configurations along the transverse direction. As embodied herein, each end wall can be planar. Additionally or alternatively, the adjacent corner column configurations along the transverse direction can define the maximum width of the main body portion. The first and second sidewalls can be spaced apart in the transverse direction a width less than the maximum transverse width. As embodied herein, each corner column configuration can have a maximum height between the bottom end and the top end. Additionally or alternatively, the first and second sidewalls can each have an overall height less than the maximum height.

Furthermore, and as embodied herein, each sidewall can be arcuate in plan view. Each sidewall can have an arcuate top edge in side view. Additionally or alternatively, the top surface can be arcuate in end view.

As embodied herein, the container can have a finish portion proximate the top surface. The finish portion can define a mouth in fluid communication with an interior chamber of the main body portion. The container can include a hollow handle portion extending from the finish portion to the top surface of main body portion. The handle portion can define a conduit in communication between the mouth of the finish portion and the interior chamber of the main body portion. Alternatively, the handle portion can define a conduit isolated from the mouth of the finish portion and the interior chamber of the main body portion. As embodied herein, the container can have a reinforcing strut joining the top surface to the handle portion. Additionally or alternatively, as embodied herein, the hollow handle portion can be configured to receive a flexible tube for flushing container contents out of the handle. Furthermore and as embodied herein, the finish portion can have a ratcheted portion proximate the top surface.

In addition, and as embodied herein, the bottom end of each corner column configuration can have a planar bottom surface. Additionally, the bottom end of each corner column configuration can have a recess feature configured to receive the stabilizing tab at the top end of each corner column configuration of a substantially similar large format container. The recess feature of each corner column configuration can have a tapered sidewall in side view to facilitate centering the stabilizing tab of a substantially similar large format container in a stacked relationship.

The container can have a bottom support surface along a bottom end of each of the first and second sidewalls. Each bottom support surface can be aligned with the planar bottom surface of two adjacent corner column configurations along the transverse direction. Additionally or alternatively, the raised bottom surface can define a center channel disposed in the longitudinal direction between the two bottom support surfaces. As embodied herein, the raised bottom surface can be contoured to receive upper features of a substantially similar large format container in a stacked relationship in either the same or opposite orientation. Additionally or alternatively, the raised bottom surface can include a recessed hand grip feature. As embodied herein, the container can include a reinforced seam defined along the raised bottom surface.

The disclosed subject matter also includes a method of making a large format container having some or all of the features described herein. Additionally, the subject matter disclosed herein includes a stack of a plurality of large format rigid structured polymer containers. As recognized in the art, the large format rigid structured polymer container disclosed herein can include some or all of the features described herein, or any suitable combination thereof.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION

Figure 1:
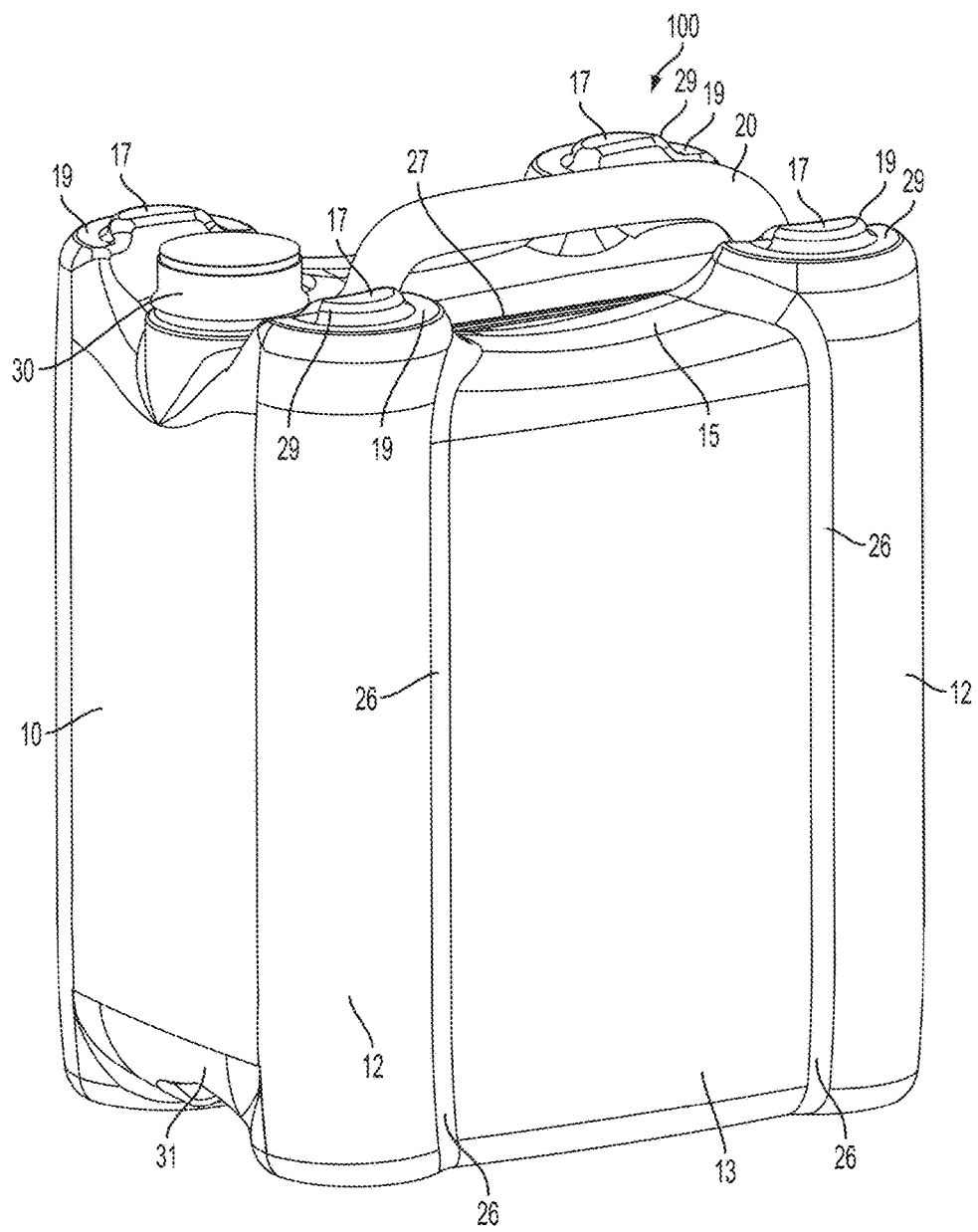
FIG. 1 is a top left perspective view of an exemplary embodiment of a container in accordance with the disclosed subject matter.

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The apparatus and methods presented herein can be used for transport of perishable or nonperishable liquids. The disclosed subject matter is particularly suited for packaging, storing, and dispensing oils.

In accordance with the disclosed subject matter herein, the container generally includes a hollow main body portion. The hollow main body portion includes a plurality of corner column configurations. Each corner column configuration has a top end and a bottom end. The top ends of the plurality of corner column configurations define a top reference plane, and the bottom ends of the plurality of corner column configurations define a bottom reference plane. The main body portion further includes first and second end walls. Each end wall extends between two adjacent corner column configurations along a transverse direction of the main body portion. The main body portion also has first and second sidewalls. Each sidewall extends between an adjacent pair of corner column configurations along a longitudinal direction of the main body portion.

The container further has a recessed top surface extending between the top ends of the four corner column configurations, and a raised bottom surface extending between the bottom ends of the four corner column configurations.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the container in accordance with the disclosed subject matter are shown in FIGS. 1-33. The container is suitable for use with a wide variety of liquids. As used herein, the terms "front," "rear," "side," "top," and "bottom" are used for the purpose of illustration only, and not limitation. That is, it is recognized that the terms "front," "rear," "side," "top," and "bottom" are interchangeable and are merely used herein as a point of reference.

Figure 2:
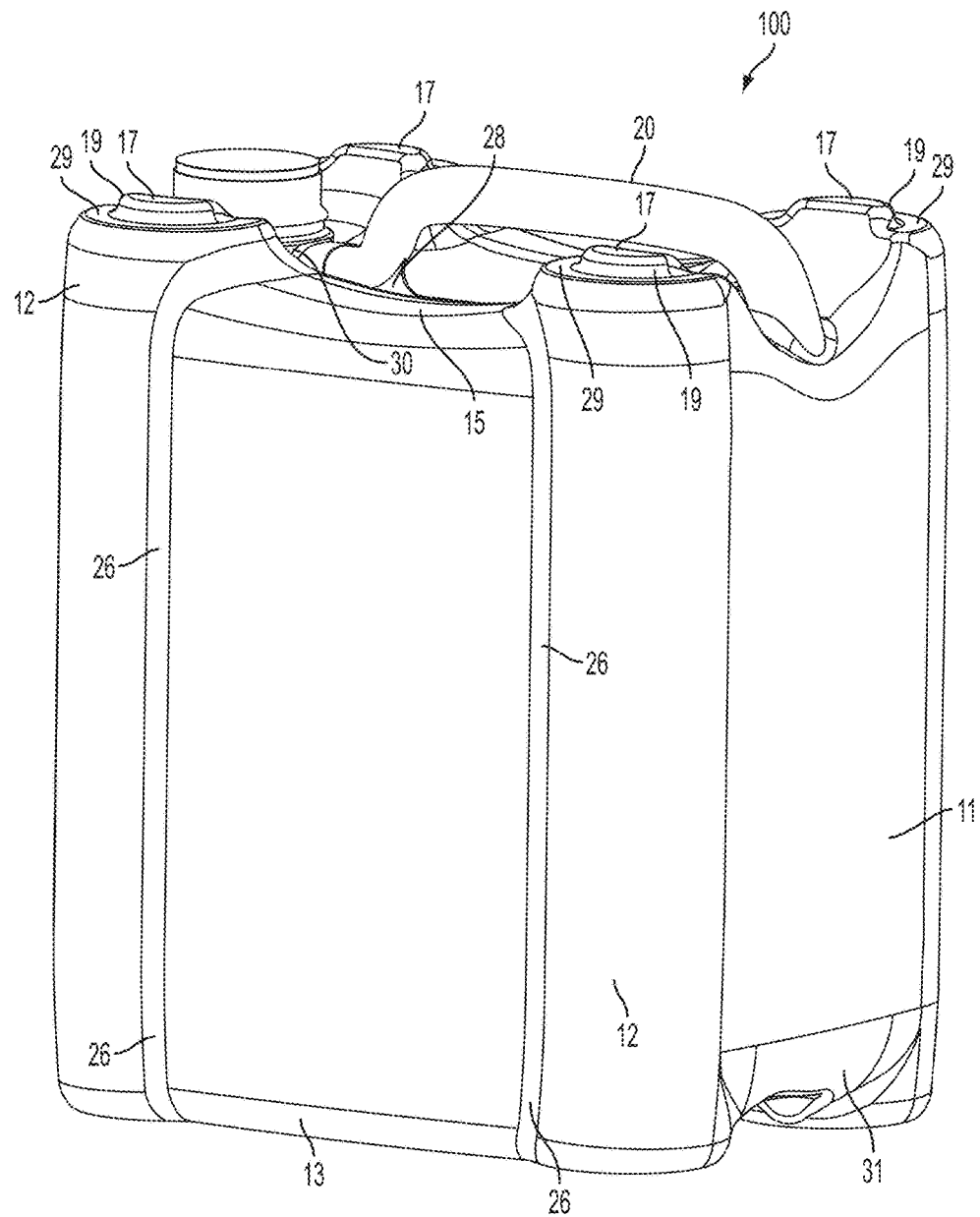
FIG. 2 is a top right perspective view of the container of FIG. 1.

For purpose of illustration, and not limitation, reference is made to the exemplary embodiment of a container 100 shown in FIGS. 1-8 and 10-16. The surface profile lines shown in FIGS. 1-16 depict contours of exemplary container surfaces for illustration only, and are not necessarily representative of seams or edges. As shown in FIGS. 1-2, container 100 generally includes a main body portion with a first end wall 10 and a second end wall 11. Each end wall extends between two adjacent corner column configurations 12 along a transverse direction of the main body portion.

Figure 6:
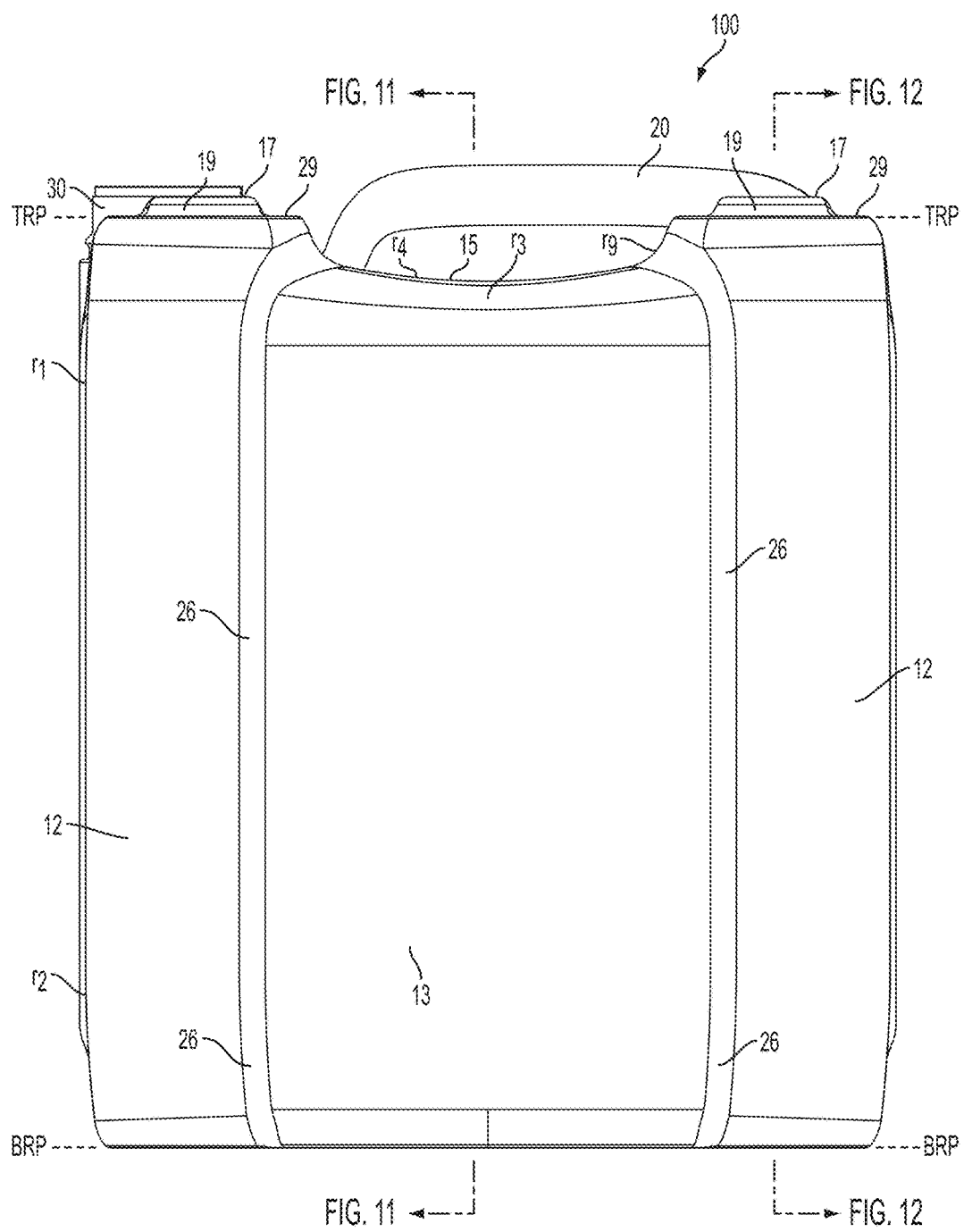
FIG. 6 is front view of the container of FIG. 1.

The main body portion also has first sidewall 13 with respect to the front view as shown, for example, in FIG. 6. As embodied herein, the rear of container 100 is a mirror image of the front and therefore has an identical and opposing second sidewall 14 as shown, for example, in FIG. 7. Each sidewall 13 and 14 extends between an adjacent pair of corner column configurations 12 along a longitudinal direction of the main body portion a distance d1, which for purpose of illustration and not limitation, and as embodied herein can be about 177 mm. For purpose of illustration, and not limitation, as shown for example in FIG. 7, column configurations 12 can have a radius of curvature r7 within a range of about 35 mm to about 51 mm, and as embodied herein, radius of curvature r7 can be about 43 mm. Additionally, for purpose of illustration, and not limitation, the intersection of the sidewalls 13, 14 with corner column configurations 12 can have a radius of curvature r10 within a range of 10 mm to 45 mm, and as embodied herein radius of curvature r10 can be about 20 mm. Column fillets 26 can be defined at the intersection of the sidewalls 13 and 14 and corner column configurations 12. As embodied herein, column fillets 26 can have a concave shape relative to the corner column configurations 12 and the sidewalls 13 and 14. As such, column fillets 26 can form a transition region between corner column configurations 12 and sidewalls 13 and 14, which can distribute stress from a load placed thereon over a larger area to allow the main body portion to bear increased loads without deformation. For purpose of illustration, and not limitation, as shown in FIG. 6, column fillets 26 can extend between corner column configurations 12, proximate top surface 15, at a radius of curvature r9 within a range of 10 mm to 40 mm, and as embodied herein radius of curvature r9 can be about 20 mm.

As embodied herein, top end 29 of each corner column configuration 12 can have a planar top surface. Furthermore, with reference to FIGS. 7-8, top end 29 of each corner column configuration can have a stabilizing tab 17, and bottom end 22 of each corner column configuration can have a recess feature 18 configured to receive the stabilizing tab 17 of a substantially similar container. Alternatively, top end 29 of each corner column configuration can have a recess feature 18 disposed at the bottom end of each corner column configuration. Recess feature 18 can be configured to receive a stabilizing tab 17 of a substantially similar container.

Figure 11:
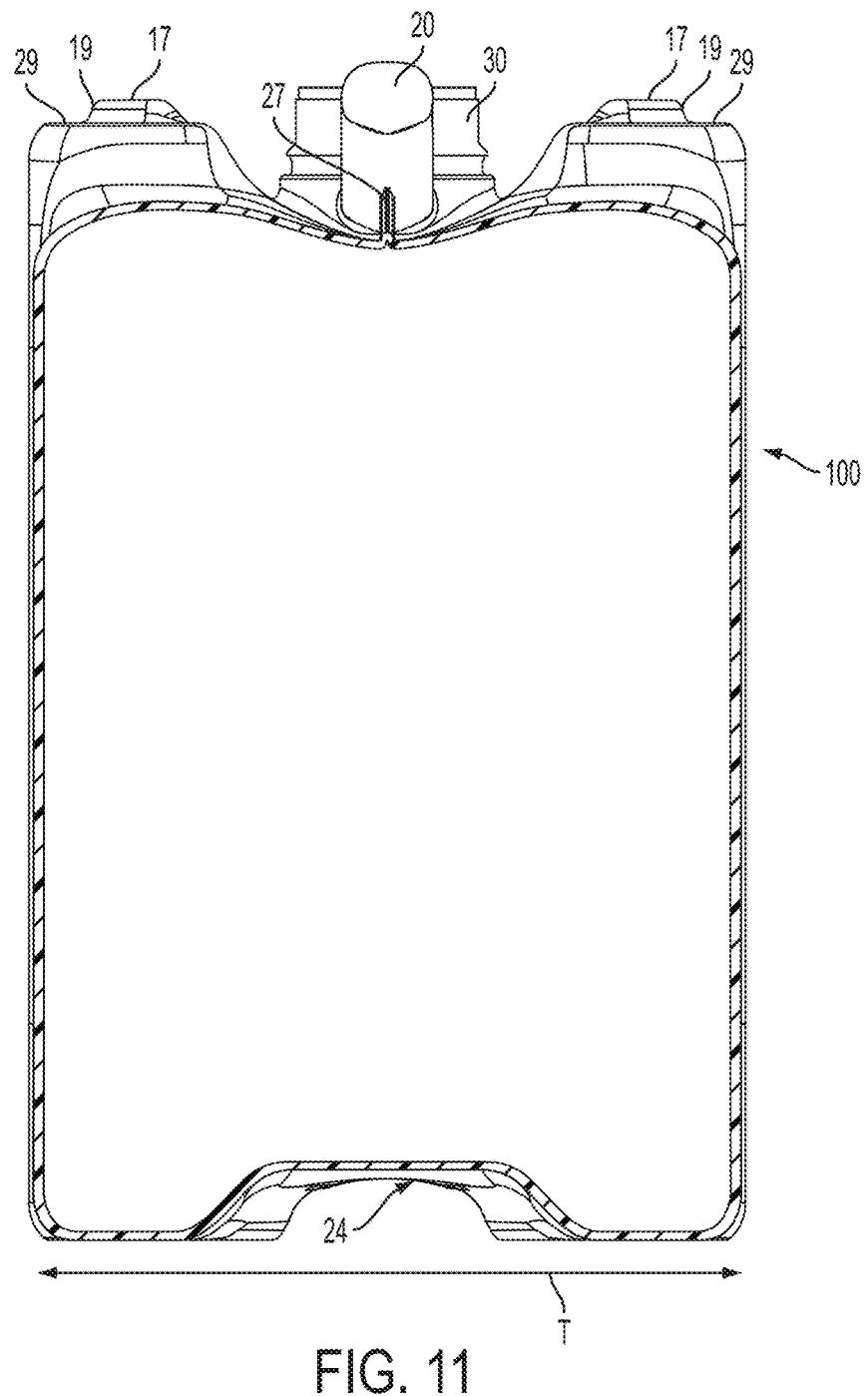
FIG. 11 is a cross-sectional view of the container of FIG. 1, taken along line 11-11 in FIG. 6.
Figure 12:
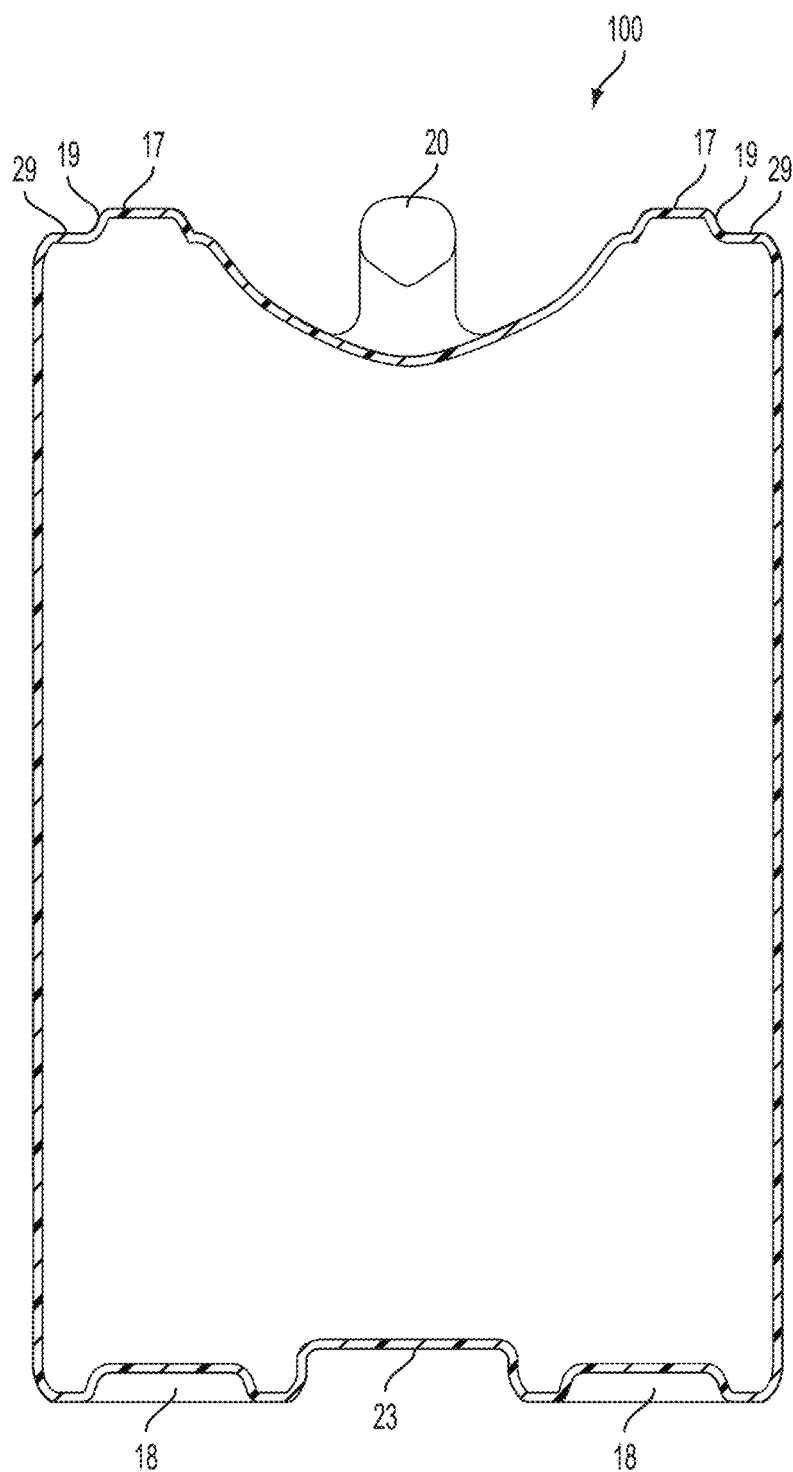
FIG. 12 is a cross-sectional view of the container of FIG. 1, taken along line 12-12 in FIG. 6.

With reference to FIG. 6, the top end 29 of each corner column configuration 12 defines a top reference plane ("TRP") and the bottom end 22 of each corner column configuration 12 defines a bottom reference plane ("BRP"). The cross-sectional view container 100 shown in FIG. 11 is taken along line 11-11 in FIG. 6. Likewise, the cross-sectional view of container 100 shown in FIG. 12 is taken along line 12-12 in FIG. 6.

Figure 5:
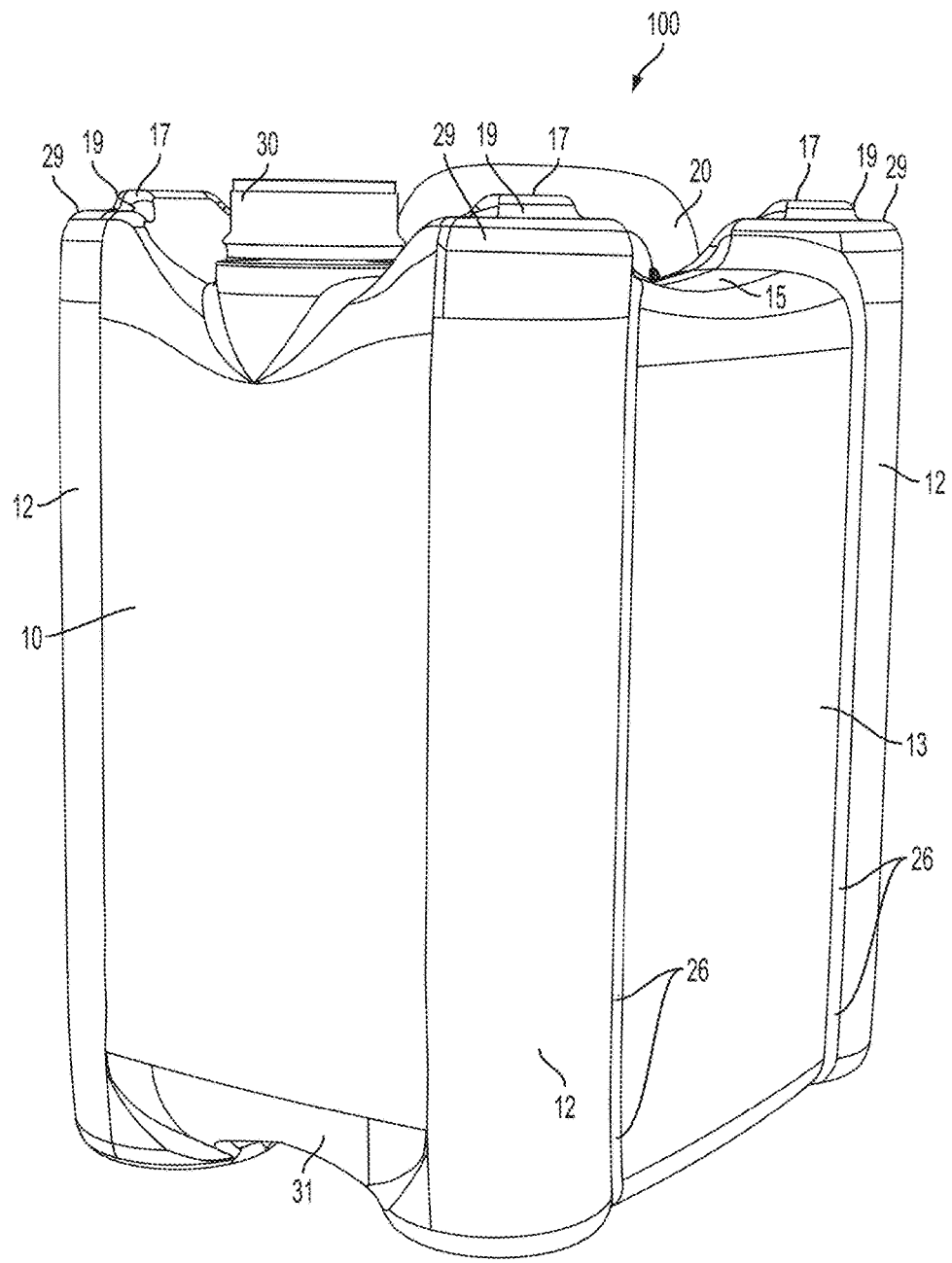
FIG. 5 is a front left perspective view of the container of FIG. 1.

Stabilizing tab 17 and recess feature 18 can facilitate stacking of similarly configured containers 100, as discussed further herein. With reference to FIG. 5, stabilizing tab 17 of each corner column configuration can have a tapered sidewall 19 in side view to facilitate locating or centering stabilizing tab 17 within recess feature 18 of a substantially similar large format container in a stacked relationship. Similarly, recess feature 18 can have a tapered sidewall in side view, which can facilitate locating or centering stabilizing tab 17 of a substantially similar large format container within recess feature 18 in a stacked relationship.

Figure 4:
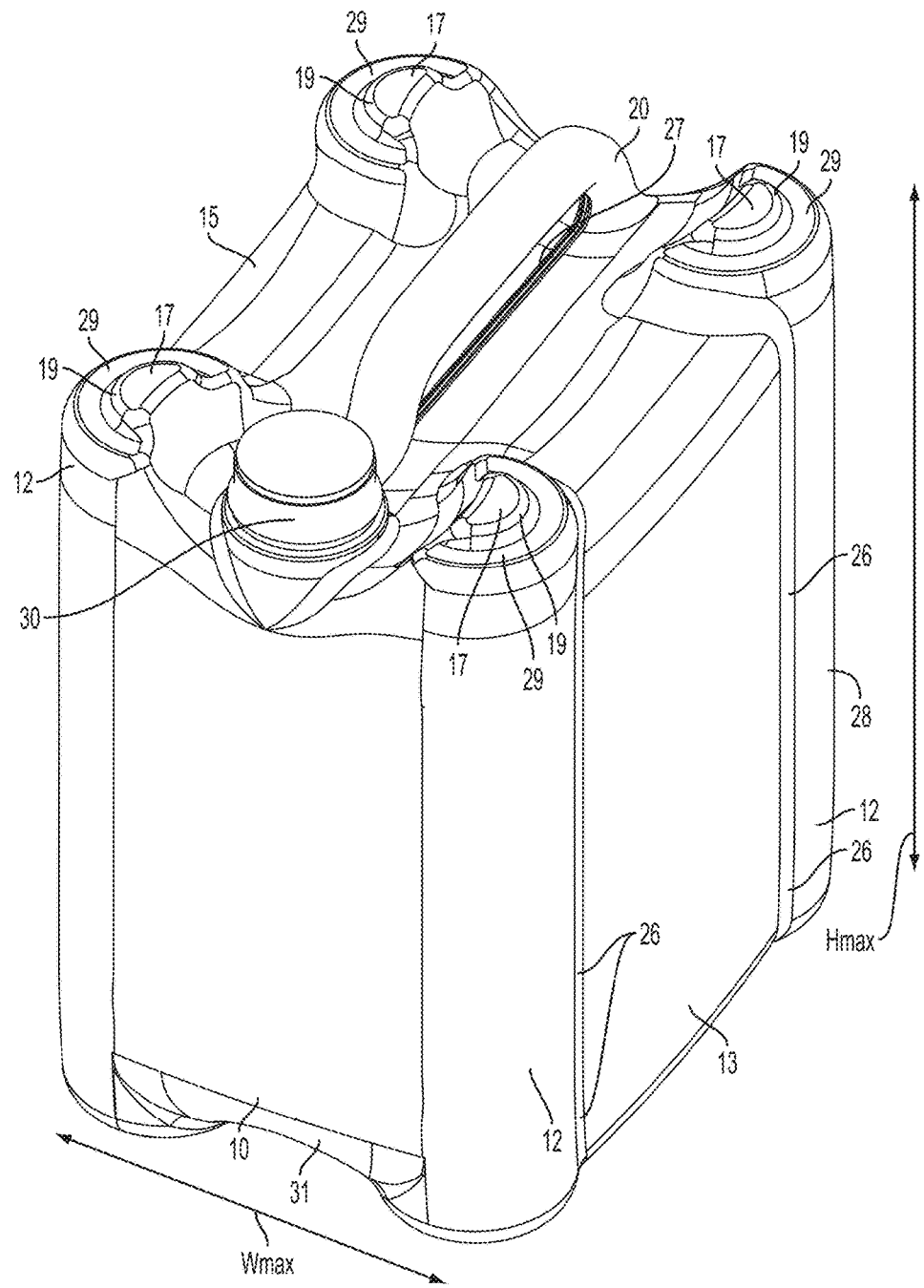
FIG. 4 is an elevated, top left perspective view of the container of FIG. 1.

With reference to FIG. 4, stabilizing tab 17 of each corner column configuration can have a partial circular shape in plan view. Alternatively, stabilizing tab 17 of each corner column configuration can have a full circular or other suitable geometric shape in plan view, and the recess, if provided, can have a corresponding or mating shape in profile.

Figure 17:
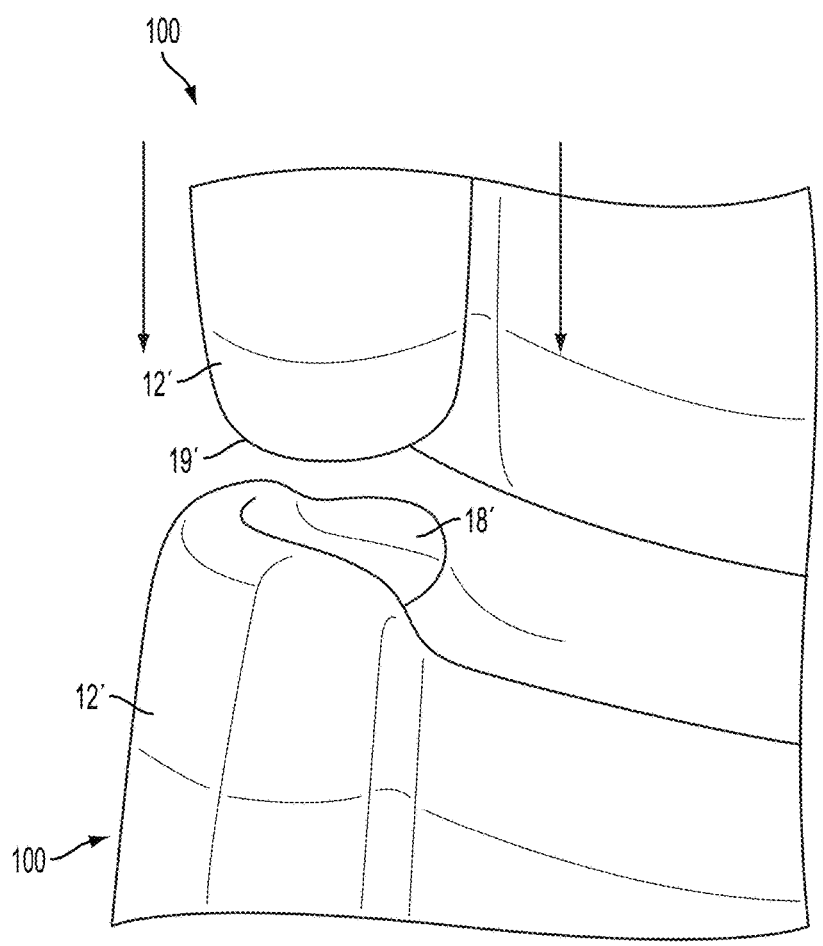
FIG. 17 is an enlarged view of an alternate embodiment of a stabilizing tab of a container in accordance with the disclosed subject matter, proximate a corresponding recess of a similarly-configured container.

Referring now to FIG. 17, an alternative embodiment of a stabilizing tab and recess feature is illustrated. As shown for example in FIG. 17, recess feature 18' can be formed as an indentation formed in an end corner of corner column configuration 12' of a container 100. As such, stabilizing tab 19' of corner column configuration 12' of a similarly configured container 100 can be formed as a corresponding indentation or tapered shape of a corresponding end corner of corner column configuration 12' to engage recess feature 18' of container 100.

Figure 7:
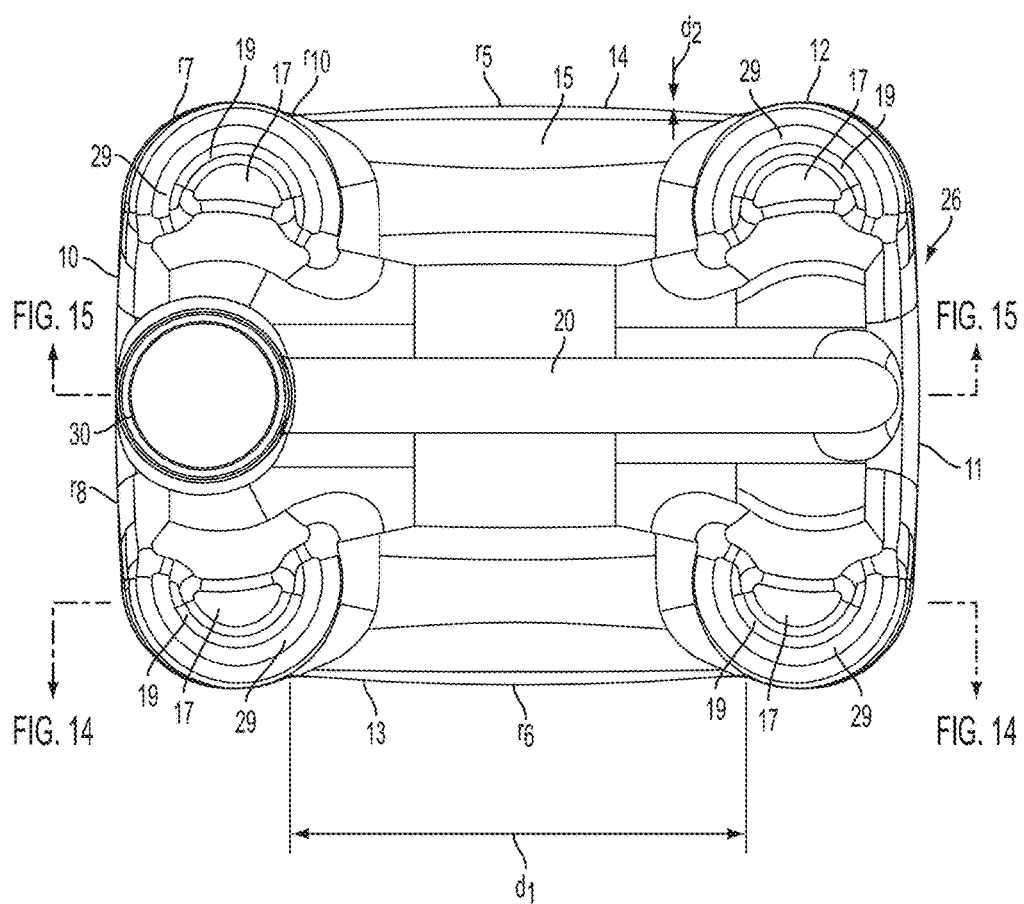
FIG. 7 is a top view of the container of FIG. 1.
Figure 14:
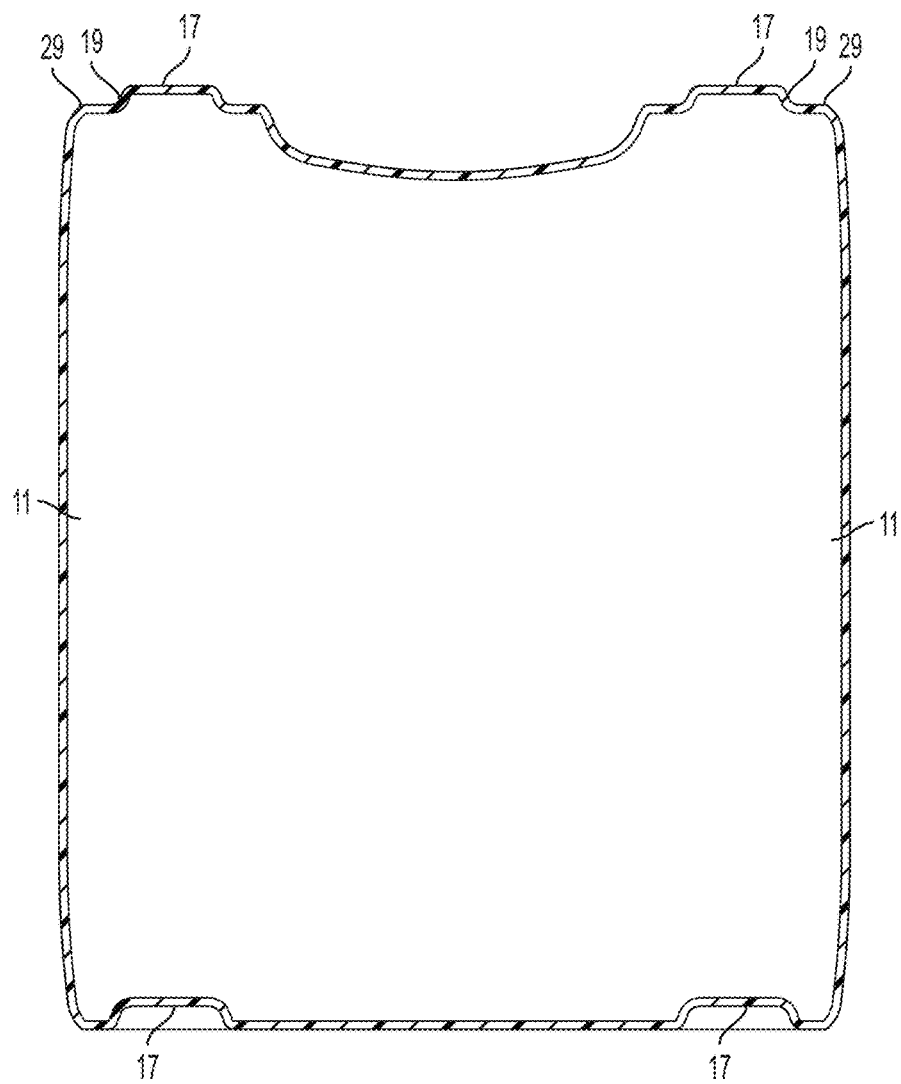
FIG. 14 is a cross-sectional view of the container of FIG. 1, taken along line 14-14 in FIG. 7.

Further in accordance with the disclosed subject matter, and with reference to FIG. 7, each corner column configuration 12 can define a partial cylindrical shape in plan view. Alternatively, each corner column configuration 12 can define a prism shape of suitable configuration to provide desired column strength and support for the container. The cross-sectional view of container 100 shown in FIG. 14 is taken along line 14-14 in FIG. 7. Furthermore, and as embodied herein, each corner column configuration 12 can be arcuate, with a curvature that extends slightly inward, towards the interior of the container 100 at each end at curvatures having radii r1, r2, respectively, as depicted for example in FIG. 6. For purpose of illustration and not limitation, radii of curvature r1 and r2 each can be within a range of 350 mm to 725 mm, and as embodied herein, r1 and r2 each can be about 520 mm. The radii of curvature r1, r2 of each corner column configuration 12 can increase the top load strength of container 100, as discussed further herein.

As embodied herein, with reference to FIGS. 1 and 2, each end wall 10 and 11 extends between two adjacent corner column configurations 12 along the transverse direction. As embodied herein, such as embodied herein, each end wall can have a generally convex shape relative to the interior of container 100. For purpose of illustration and not limitation, as shown for example in FIG. 7, each end wall 10, 11 can have a radius of curvature r8 within a range of about 367 mm to about 3920 mm, and as embodied herein, radius of curvature r8 of each end wall 10, 11 can be about 1164 mm. Each end wall 10, 11 can also have a straight top edge or an arcuate top edge in side view.

Figure 13:
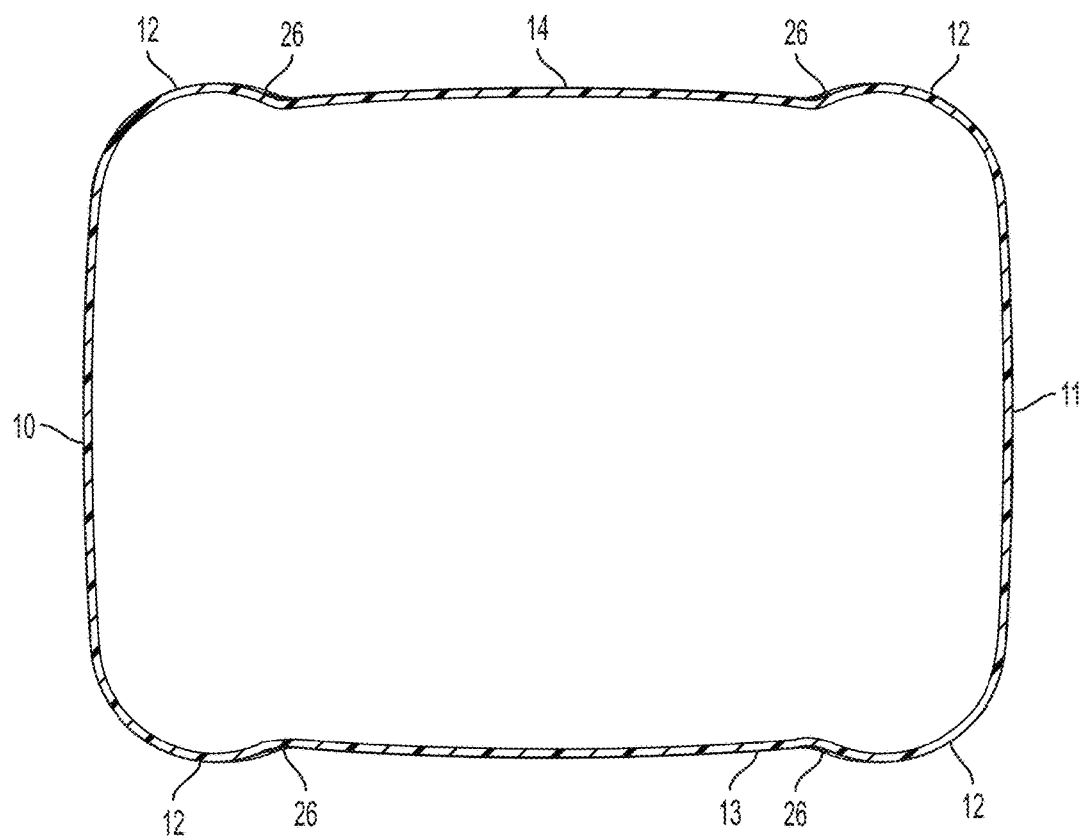
FIG. 13 is a cross-sectional view of the container of FIG. 1, taken along line 13-13 in FIG. 9.

As embodied herein, with reference to FIGS. 1 and 2, each sidewall 13 and 14 extends between two adjacent corner column configurations 12 along the longitudinal direction. As embodied herein, each sidewall 13, 14 can have a generally convex shape relative to the interior of container 100. For purpose of illustration and not limitation, as shown for example in FIG. 7, radii of curvature r5 and r6 of sidewalls 13, 14 each can be within a range of about 288 mm to about 2866 mm, and as embodied herein, r5 and r6 each can be about 1078 mm. Each sidewall 13, 14 can also have a straight top edge or an arcuate top edge in side view. With reference to FIG. 13, the convex shape of end wall 10 and 11 and sidewall 13 and 14 provides structural integrity to container 100 by transferring the weight of a load placed thereon to corner column configurations 12, to allow the main body portion to bear increased loads without deformation. Each sidewall 13 and 14 can be offset inward a distance d2 toward the interior of container 100 relative the opposing corner column configurations 12 at each end of the sidewalls 13, 14. For purpose of illustration and not limitation, as shown in FIG. 7 and as embodied herein, the inward offset distance d2 of each sidewall 13, 14 can be about 1.5 mm. The inwardly offset position of sidewalls 13, 14 can inhibit or prevent sidewalls 13, 14 from engaging sidewalls 13, 14 of a similarly configured container 100 disposed alongside container 100. Additionally or alternatively, the inwardly offset position can accommodate a label, a folded pamphlet, or other printed material attached to the sidewall 13, 14 and can protect the label or printed material from contact with the sidewall 13, 14 of a similarly configured container 100.

With reference to FIGS. 3-4, 6 and 7, container 100 further has a recessed top surface 15 extending between top ends of the four corner column configurations 12. Top surface 15 can be concave as embodied herein. For purpose of illustration, and not limitation, as shown in FIG. 6, top surface 15 can extend between corner column configurations 12 at a radius of curvature r4 within a range of 150 mm to 500 mm, and as embodied herein radius of curvature r4 can be about 262 mm. Alternatively, top surface 15 can be convex relative to the interior of container 100, or can have any other suitable arcuate shape. As a further alternative, top surface 15 can have a generally planar shape. A seam 27 can be defined along the top surface 15 extending beneath the length of handle 20. For example, seam 27 can define a pinch-off seam resulting from the formation of the container during blow molding. Extrusion blow molded containers can fail at the parison pinch-off seam of the mold parting line, which include cracking from impact, fatigue failure from flexing, or chemical stress cracking. Seam 27 therefore provides structural integrity to container 100. Additionally or alternatively, top surface 15 can have a curved portion extending to side walls 13, 14. For purpose of illustration, and not limitation, as shown in FIG. 6, top surface 15 can extend to side walls 13, 14 at a radius of curvature r3 within a range of 13 mm to 20 mm, and as embodied herein radius of curvature r3 can be about 16 mm.

Containers according to the disclosed subject matter can be provided in alternative sizes and dimensions from those described herein, for example and not limitation, by increasing or decreasing the scale of dimensions described herein. For purpose of illustration and not limitation, sidewalls 13, 14 can have a ratio of radius of curvature r5, r6 over distance d1 between corner columns 12 (r5, r6/d1) between about 1.627 to about 16.192, and as embodied herein, r5, r6/d1 can be about 6.090. Additionally or alternatively, sidewalls 13, 14 can have a ratio of radius of curvature r5, r6 compared to radius of curvature r7 of corner columns 12 (r5, r6/r7) between about 5.647 to about 81.886, and as embodied herein, r5, r6/r7 can be about 25.070.

Figure 16:
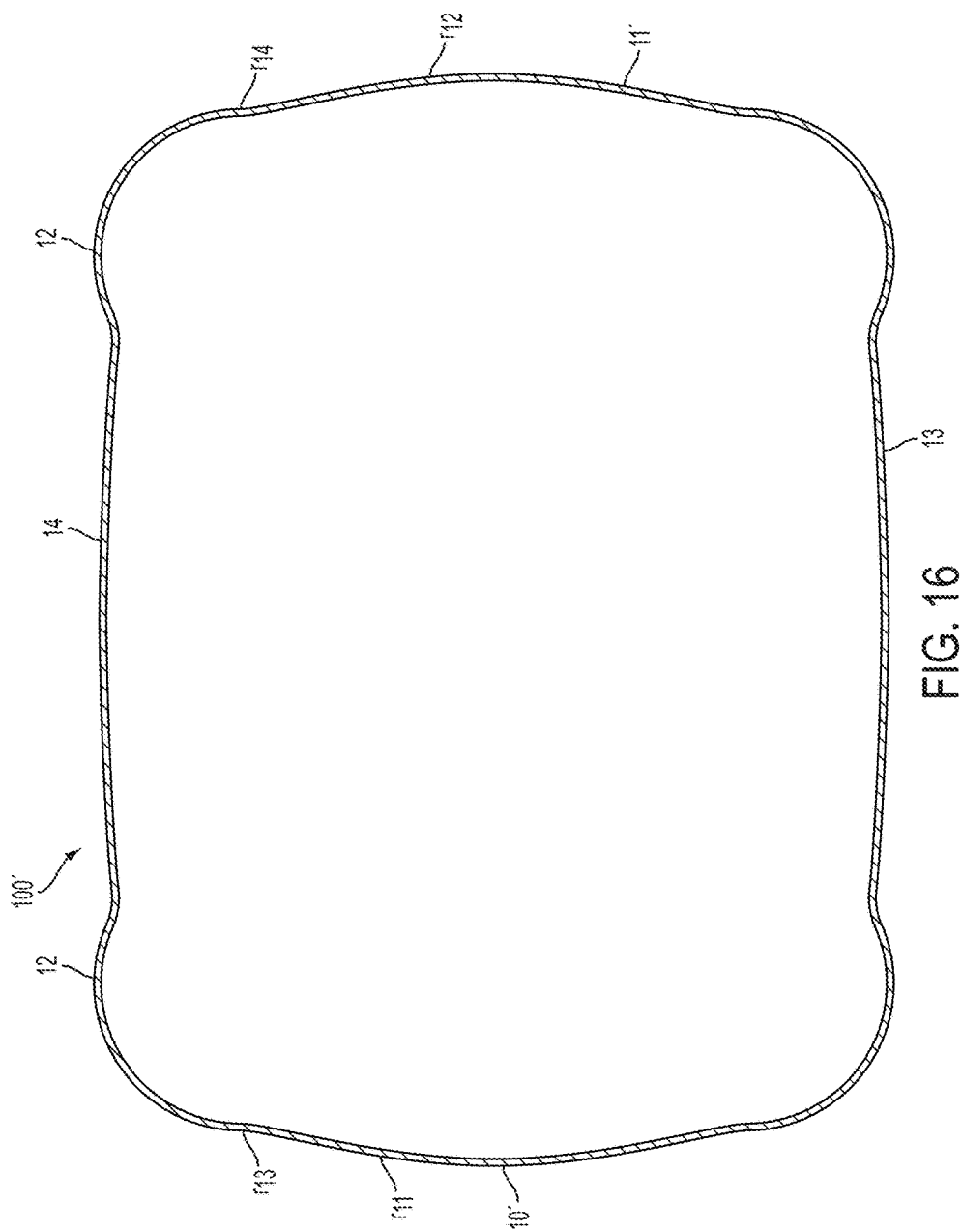
FIG. 16 is a cross-sectional view of an alternate embodiment of a container, taken at a similar view as FIG. 13 of the container of FIG. 9, illustrating a different end wall curvature than that of FIGS. 1 and 9.

For purpose of illustration and not limitation, as embodied herein, end walls 10, 11 can have a ratio of radius of curvature r8 compared to radius of curvature r7 of corner columns 12 (r8/r7) between about 7.196 to about 112, and as embodied herein, r8/r7 can be about 26.070. For example and without limitation, FIG. 16 shows an alternative embodiment of a container 100' having end walls 10', 11' with a different radius of curvature. For purpose of illustration, and not limitation end walls 10'. 11' can have a radius of curvature r11, r12 within a range of about 150 mm to about 245 mm, and as embodied herein, radius of curvature r11, r12 of each end wall 10', 11' can be about 195 mm. As such, end walls 10', 11' can have a ratio of radius of curvature r11, r12 compared to radius of curvature r7 of corner columns 12 (r11, r12/r7) between about 2.941 to about 7.000, and as embodied herein, r11, r12/r7 can be about 4.535. Additionally or alternatively, and as embodied herein, the intersection of the end walls 10', 11' with corner column configurations 12 can have a radius of curvature r13, r14 within a range of about 26 mm to about 66 mm. and as embodied herein radius of curvature r13 can be about 44 mm.

Figure 8:
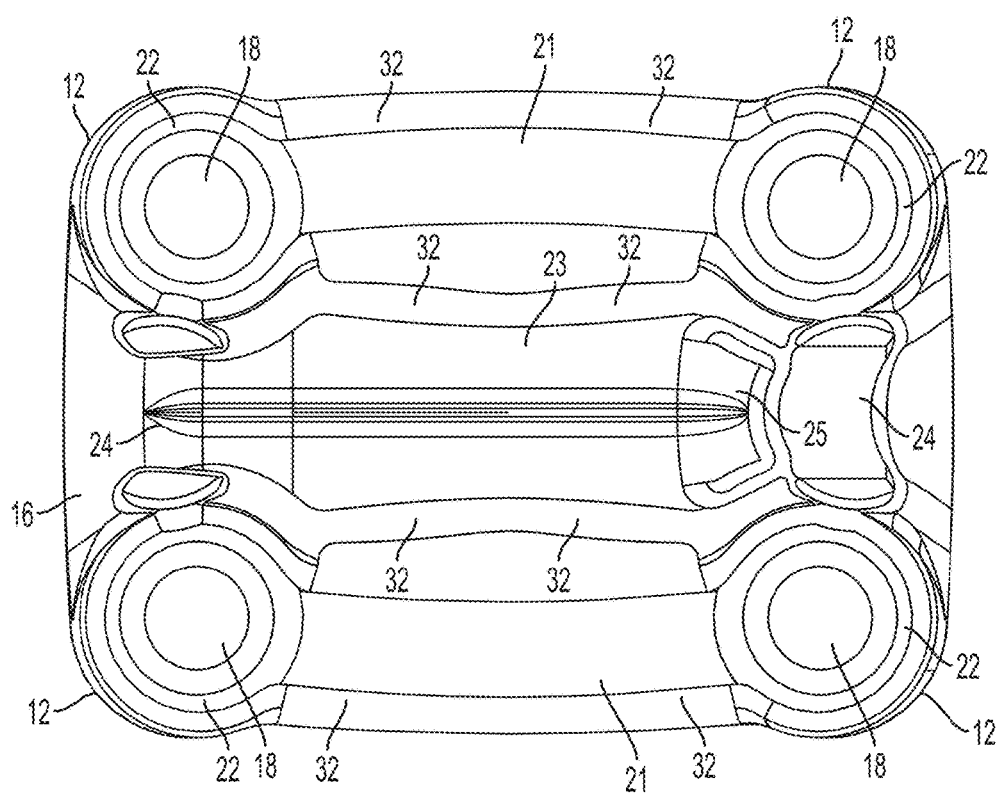
FIG. 8 is a bottom view of the container of FIG. 1.

With reference to FIG. 8, the container further has a raised bottom surface 16 extending between the bottom ends of corner column configurations 12. Furthermore, and as embodied herein, bottom surface 16 can be concave relative to the interior of container 100. For example, bottom surface 16 can have a generally arcuate shape. Alternatively, bottom surface 16 can have a generally planar shape. Furthermore, a bridge section 31 defines an intersection between each end wall 10 and 11 and the raised bottom surface 16, as shown in FIGS. 1-5. Bridge section 31 can provide additional structural integrity to the container 100 by distributing stress from a load placed thereon to the corner column configurations 12, to allow the main body portion to bear increased loads without deformation.

With further reference to FIG. 8, bottom fillets 32 can be defined at the intersection of the planar bottom surface 22 of the corner column configurations 12, bottom support surfaces 21, and center channel 23. As embodied herein, bottom fillets 32 can have a concave shape relative to the planar bottom surface 22 of the corner column configurations 12, the bottom support surfaces 21, and center channel 23. As such, bottom fillets 32 can form a transition region between planar bottom surface 22 of the corner column configurations 12, the bottom support surfaces 21, and center channel 23, which can distribute stress from a load placed thereon over a larger area to allow the main body portion to bear increased loads without deformation.

In an alternative embodiment, as depicted in FIGS. 19-21 and 25, for purpose of illustration and not limitation, a reinforced seam 33 can be defined along the bottom surface 16 to the bridge section 31 of container 300. Reinforced seam 33 thus can be configured to provide additional structural integrity to container 300. It will be understood that the reinforced seam 33 can be formed using any suitable technique, including compression molding, etc.

In accordance with another aspect of the disclosed subject matter, a finish portion can be provided. For example, and as embodied herein, the container can have a finish portion 30 proximate the top surface as depicted in FIGS. 1-7. Finish portion 30 can define a mouth in fluid communication with an interior chamber of the main body portion of container 100. Finish portion 30 can be circular, oval, or any other shape suitable for pouring fluid contents from the container. As embodied herein, finish portion 30 can have an engagement to receive a cap to cover the mouth, as shown for example, in FIG. 10. The engagement can be threaded, friction fit, snap fit, or any other suitable engagement to provide a liquid-tight engagement with cap to retain the container contents when cap is engaged. In an alternative embodiment, as depicted in FIGS. 27-29 and 32, for purpose of illustration and not limitation, finish portion 30 of container 400 can have a ratcheted portion 34 proximate the top surface 15, which can accommodate a ratcheted cap thereon.

In accordance with another aspect of the disclosed subject matter herein, the container can have a handle. For example, and as depicted in FIGS. 1-7, the container can further comprise a handle portion 20 extending from finish portion 30 to the top surface 15 of main body portion of container 100. As embodied herein, handle portion 20 can define a conduit in communication between the mouth of finish portion 30 and the interior chamber of container 100. Furthermore, handle portion 20 can be hollow and can be configured to receive a flexible tube for flushing container contents out of the handle, for example by directing water or air through the handle.

Figure 3:
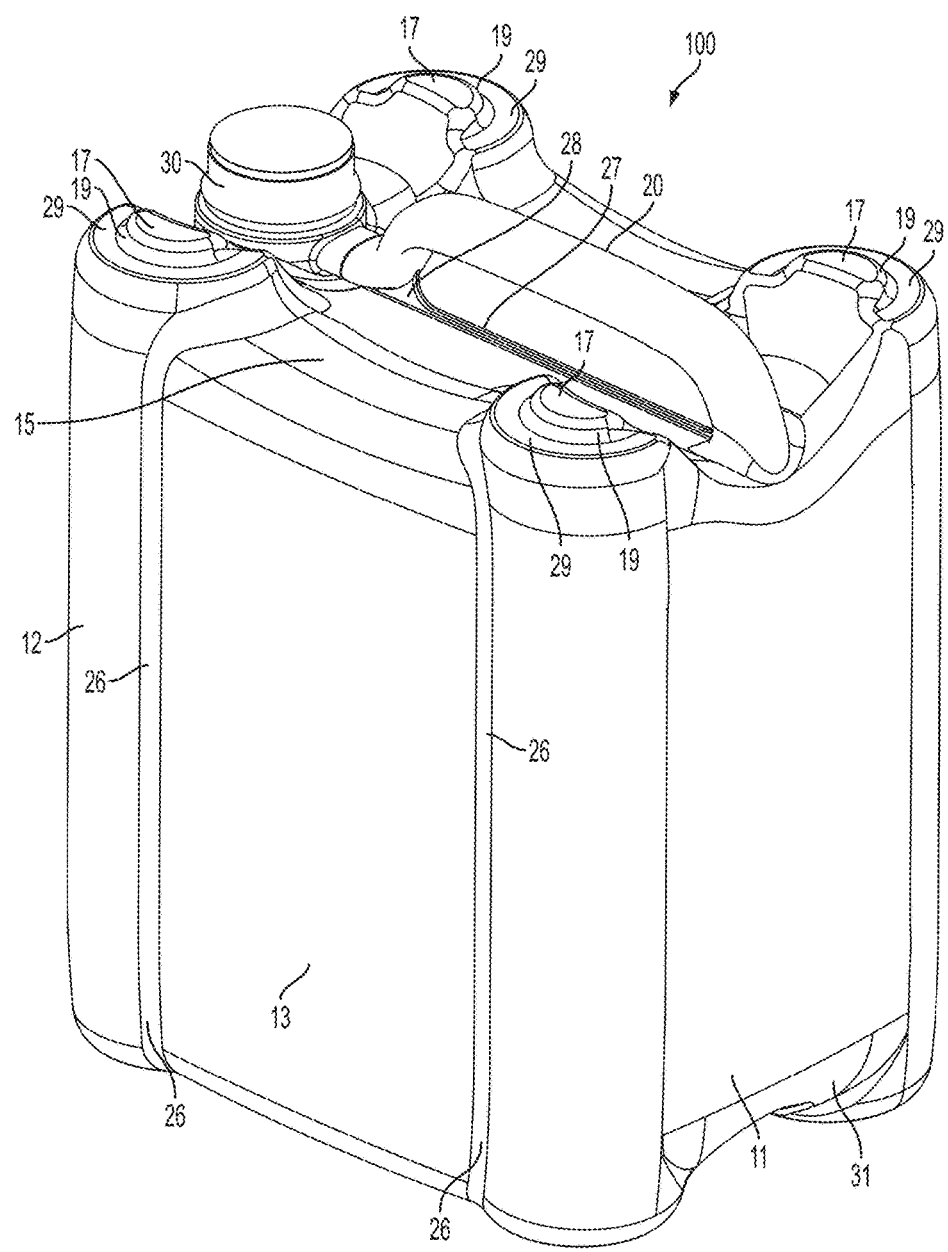
FIG. 3 is an elevated, top right perspective view of the container of FIG. 1.

Handle portion 20 can be arcuate, U-shaped, or any other shape suitable for handling the container. Furthermore, the handle can define a cavity or opening between handle portion 20 and top surface 15 of the container to facilitate gripping of the handle portion 20. Alternatively, handle portion 20 can be integrally formed with the main body portion of container 100 and include one or more recesses to facilitate gripping. Handle portion 20 can extend to a height corresponding to a recess in the bottom surface 16 of a similarly configured container 100 to avoid interference of handle portion 20 with the center channel 23 of bottom surface 16 of similarly configured container 100 when stacking. With reference to FIGS. 2-3, a support web 28 defined at an intersection of seam 27 proximate finish portion 30 can provide a transition portion between seam 27 and finish portion 30. As embodied herein, support web 28 is triangular, but can have any suitable geometric shape. Support web 28 can provide additional structural integrity to the handle 20 by distributing stress from a load placed thereon over a larger area to allow the main body portion to bear increased loads without deformation.

Figure 15:
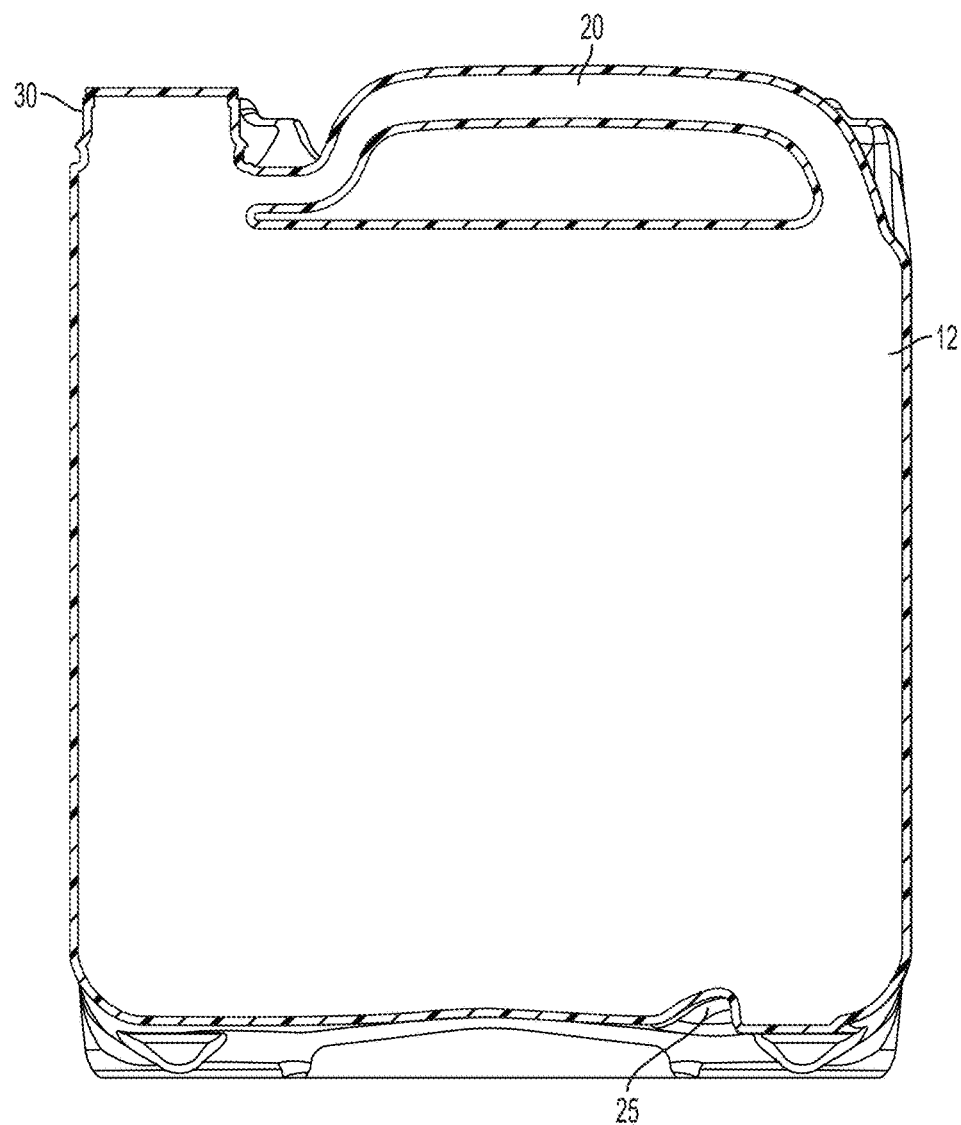
FIG. 15 is a cross-sectional view of the container of FIG. 1, taken along line 15-15 in FIG. 7.

With reference to FIG. 15, the handle portion 20 can further define a conduit in communication between the mouth of the finish portion 30 and the interior chamber of the main body portion of container 100. If provided, the conduit can provide suitable venting in the container to allow the flow of air into the container along with the flow of liquid out of the mouth of the container, which can reduce or prevent gulping or glugging when pouring fluid contents from the container.

In an alternative embodiment, as depicted in FIGS. 19, 21-24, and 26, for purpose of illustration and not limitation, the handle portion 20 of plastic container 300 can be isolated from the mouth of the finish portion 30 and the interior chamber of the main body portion of container 300. For example, and as embodied herein, the handle portion 20 can define a conduit sealed off at a portion 36 proximate the finish portion 30. Additionally or alternatively, the handle portion 20 can be sealed off at a portion 37 proximate the top surface 15. It will be understood that the handle portion 20 can be sealed off using any suitable technique, including compression molding, etc.

Figure 19:
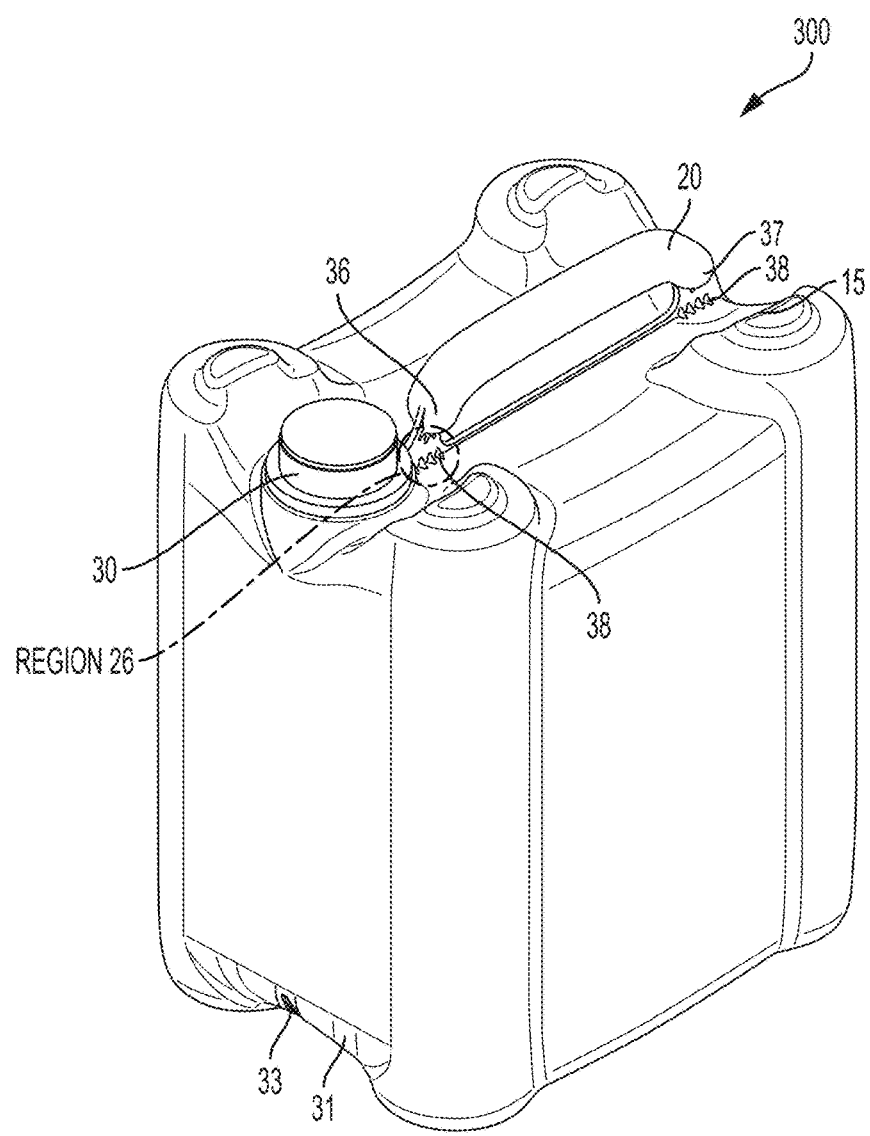
FIG. 19 is a perspective view of another exemplary embodiment of a container in accordance with the disclosed subject matter.
Figure 20:
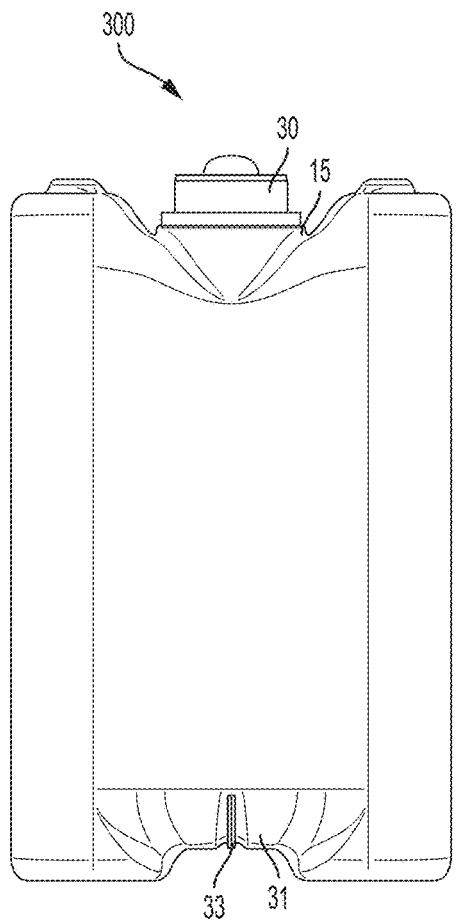
FIG. 20 is a front view of the container of FIG. 19.
Figure 21:
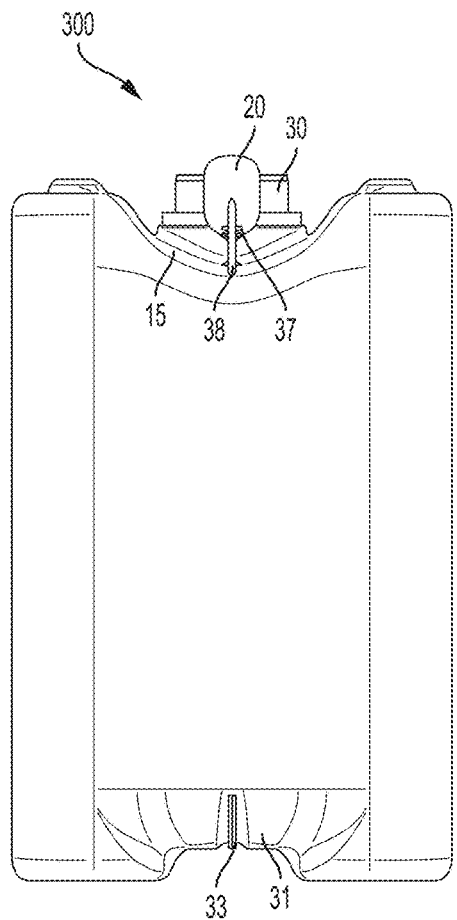
FIG. 21 is a rear view of the container of FIG. 19.
Figure 22:
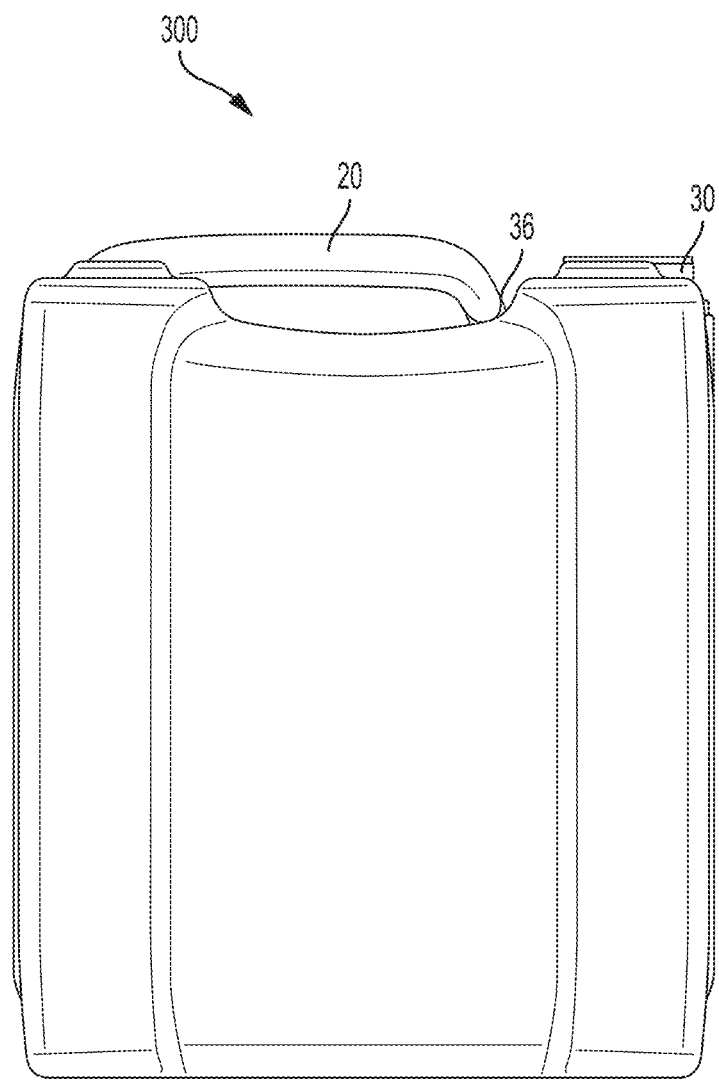
FIG. 22 is a left side view of the container of FIG. 19.
Figure 23:
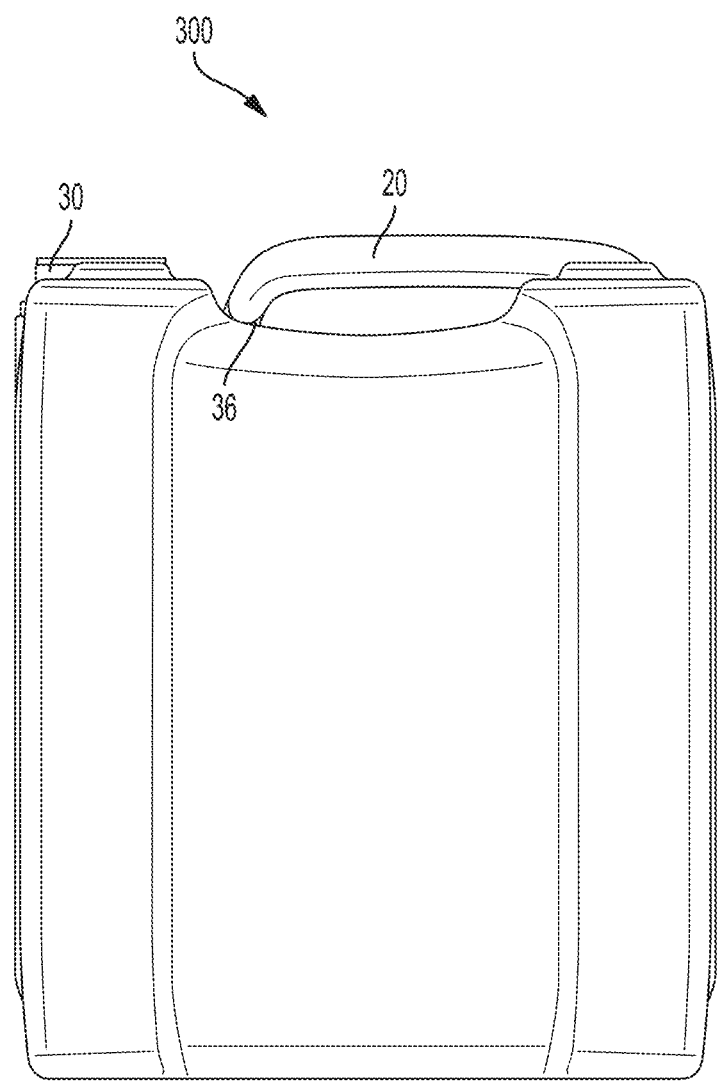
FIG. 23 is a right side view of the container of FIG. 19.
Figure 24:
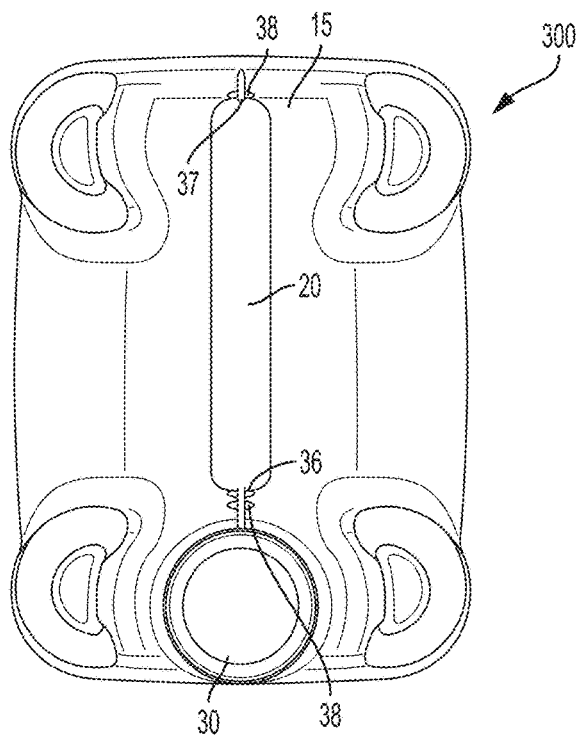
FIG. 24 is a top view of the container of FIG. 19.

With reference to FIGS. 19, 21-24, and 26, the container 300 can further include at least one reinforcing strut 38 joining the top surface 15 to the handle portion 20. For example, and as embodied herein, the container 300 can further include a plurality of reinforcing struts joining the top surface 15 to the handle portion 20. As depicted in FIGS. 19, 22, and 24, for purpose of illustration and not limitation, the container 300 can further include a plurality of reinforcing struts joining the top surface 15 to the portion 36 of the handle portion 20, which can be isolated from the finish portion 30 as described herein. Additionally or alternatively, the container 300 can further include a plurality of reinforcing struts joining the top surface 15 to the portion 37 of the handle portion 20, which can be isolated from the top surface 15 as depicted in FIGS. 19, 21, and 24. For example, and as depicted in FIGS. 19, 21-24, and 26, for purpose of illustration and not limitation, a large format rigid polymer container can be provided with four reinforcing struts 38 joining the top surface 15 to the portion 36 of the handle portion 20 and four reinforcing struts 38 joining the top surface 15 to the portion 37 of the handle portion 20.

Figure 25:
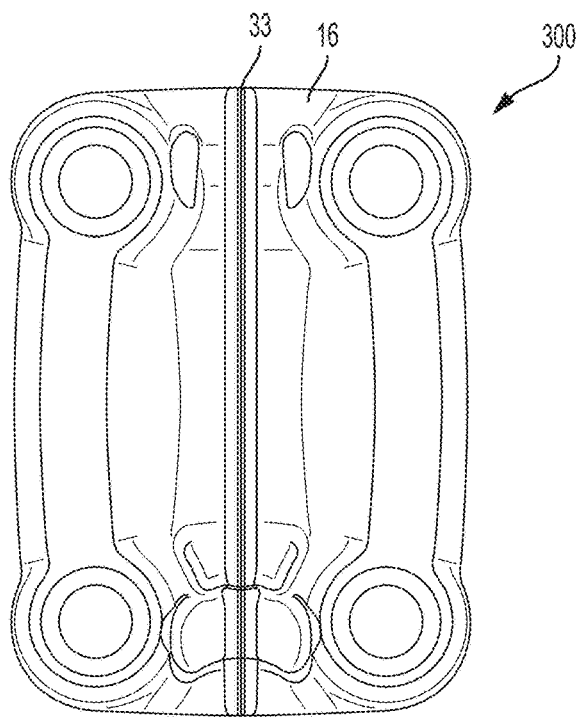
FIG. 25 is a bottom view of the container of FIG. 19.
Figure 26:
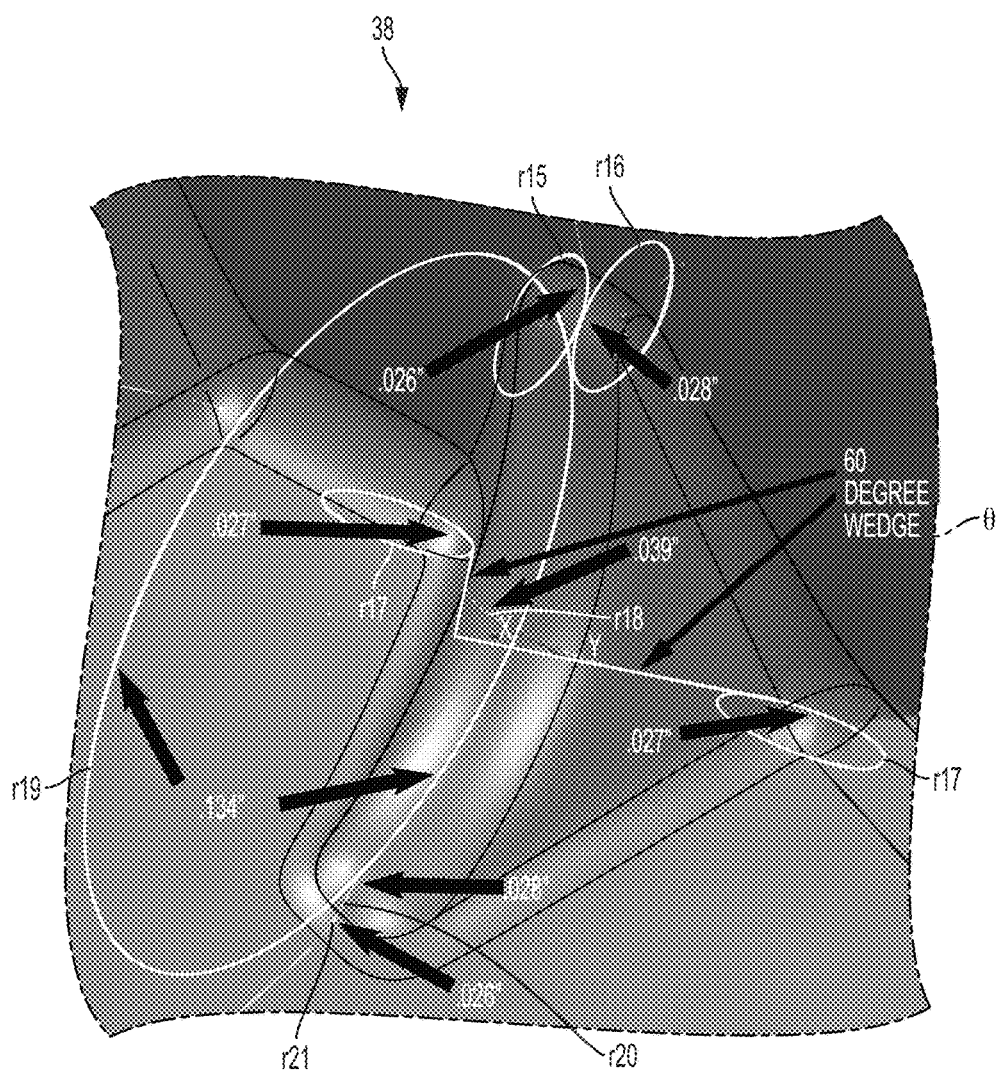
FIG. 26 is a detail view of region 26 of the container of FIG. 19.
Figure 27:
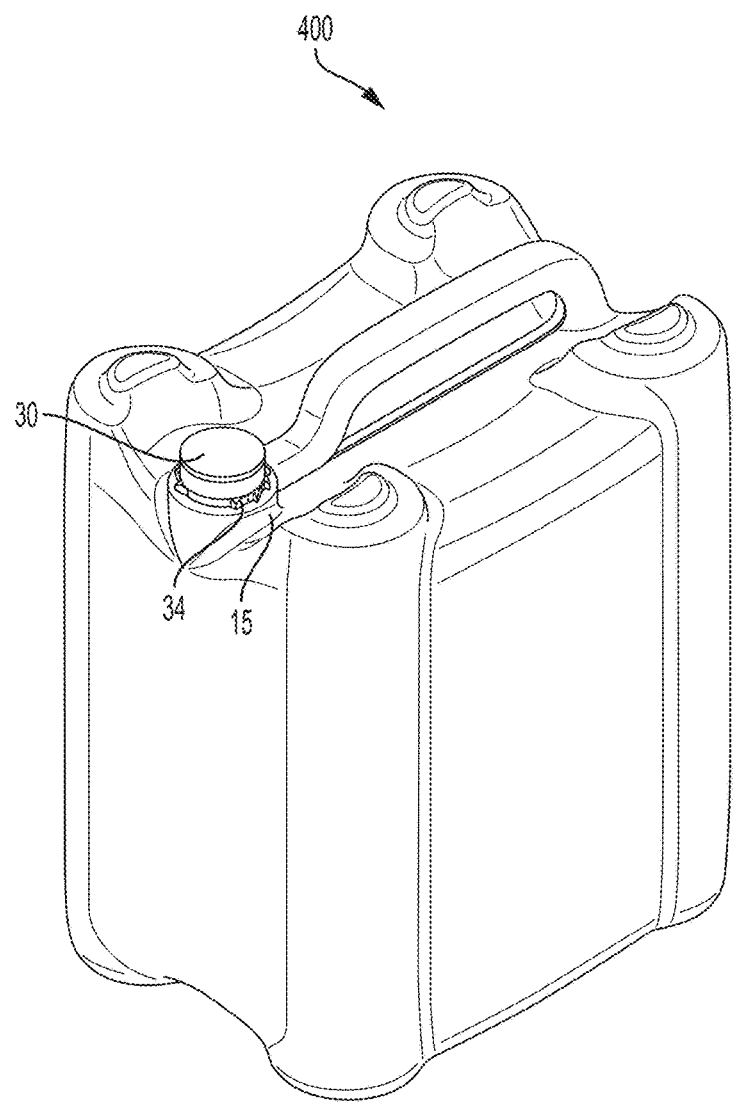
FIG. 27 is a perspective view of another exemplary embodiment of a container in accordance with the disclosed subject matter.
Figure 28:
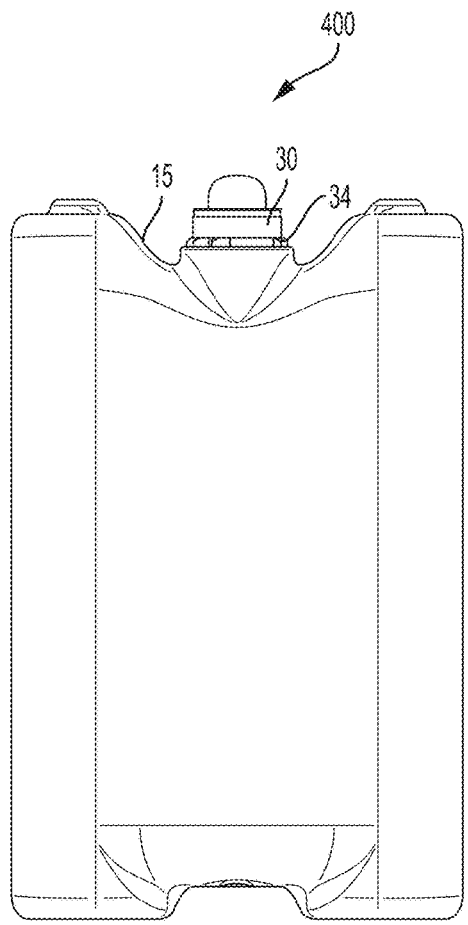
FIG. 28 is a front view of the container of FIG. 27.
Figure 29:
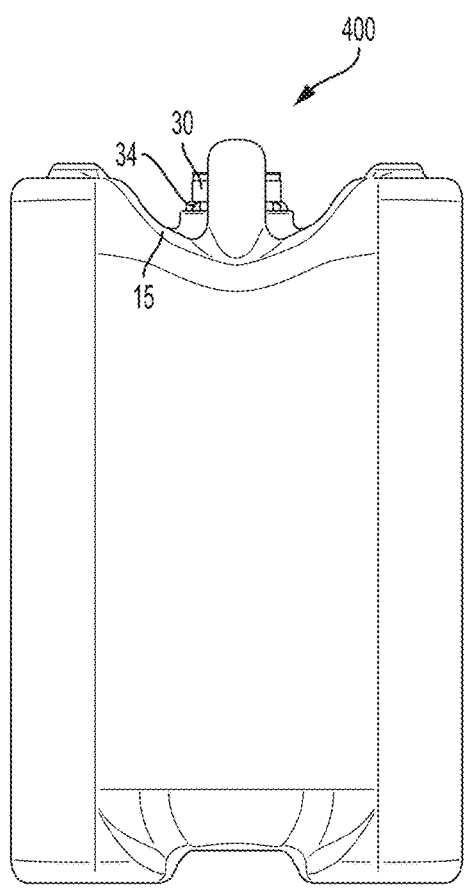
FIG. 29 is a rear view of the container of FIG. 27.
Figure 30:
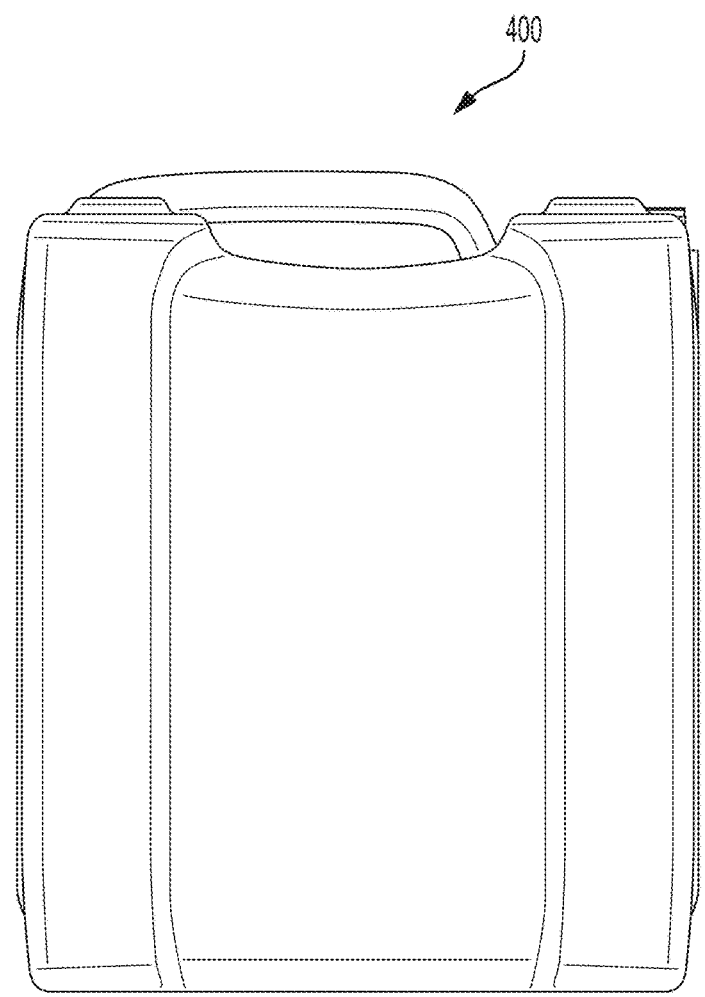
FIG. 30 is a left side view of the container of FIG. 27.
Figure 31:
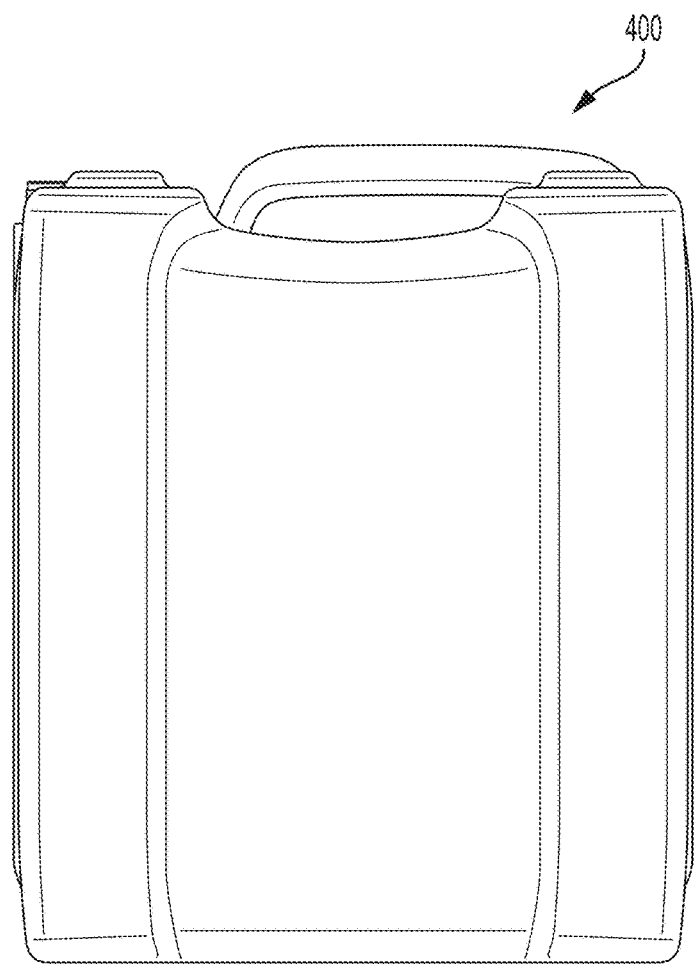
FIG. 31 is a right side view of the container of FIG. 27.
Figure 32:
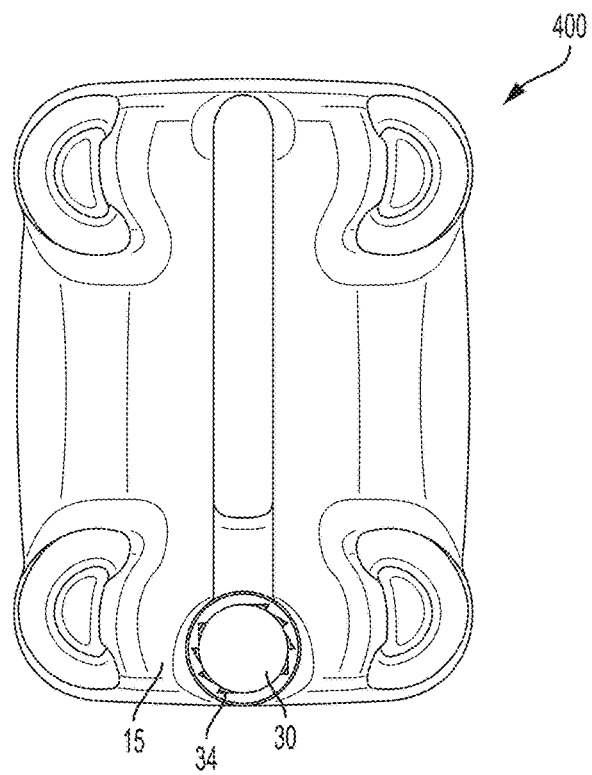
FIG. 32 is a top view of the container of FIG. 27.

Furthermore, and as embodied herein, reinforcing strut 38 of container 300 can have radii of curvature, as depicted, for example in FIG. 26. For purpose of illustration, and not limitation, as shown for example in FIG. 26, reinforcing strut 38 can have a radius of curvature r15 within a range of about 0.016" to about 0.036", and as embodied herein, radius of curvature r15 can be about 0.026". Additionally or alternatively, reinforcing strut 38 can have a radius of curvature r16 within a range of about 0.018" to about 0.038", and as embodied herein, radius of curvature r16 can be about 0.028". Additionally or alternatively, reinforcing strut 38 can have a radius of curvature r17 within a range of about 0.017" to about 0.037", and as embodied herein, radius of curvature r17 can be about 0.027". Additionally or alternatively, reinforcing strut 38 can have a radius of curvature r18 within a range of about 0.029" to about 0.049", and as embodied herein, radius of curvature r18 can be about 0.039". Additionally or alternatively, reinforcing strut 38 can have a radius of curvature r19 within a range of about 0.104" to about 0.164", and as embodied herein, radius of curvature r19 can be about 0.134". Additionally or alternatively, reinforcing strut 38 can have a radius of curvature r20 within a range of about 0.018" to about 0.038", and as embodied herein, radius of curvature r20 can be about 0.028". Additionally or alternatively, reinforcing strut 38 can have a radius of curvature r21 within a range of about 0.016" to about 0.036", and as embodied herein, radius of curvature r21 can be about 0.026". As depicted in FIG. 25, for purpose of illustration and not limitation, the reinforcing strut 38 can have an angle θ within a range of 30° to 90°, and as embodied herein angle θ can be about 60°.

Figure 10:
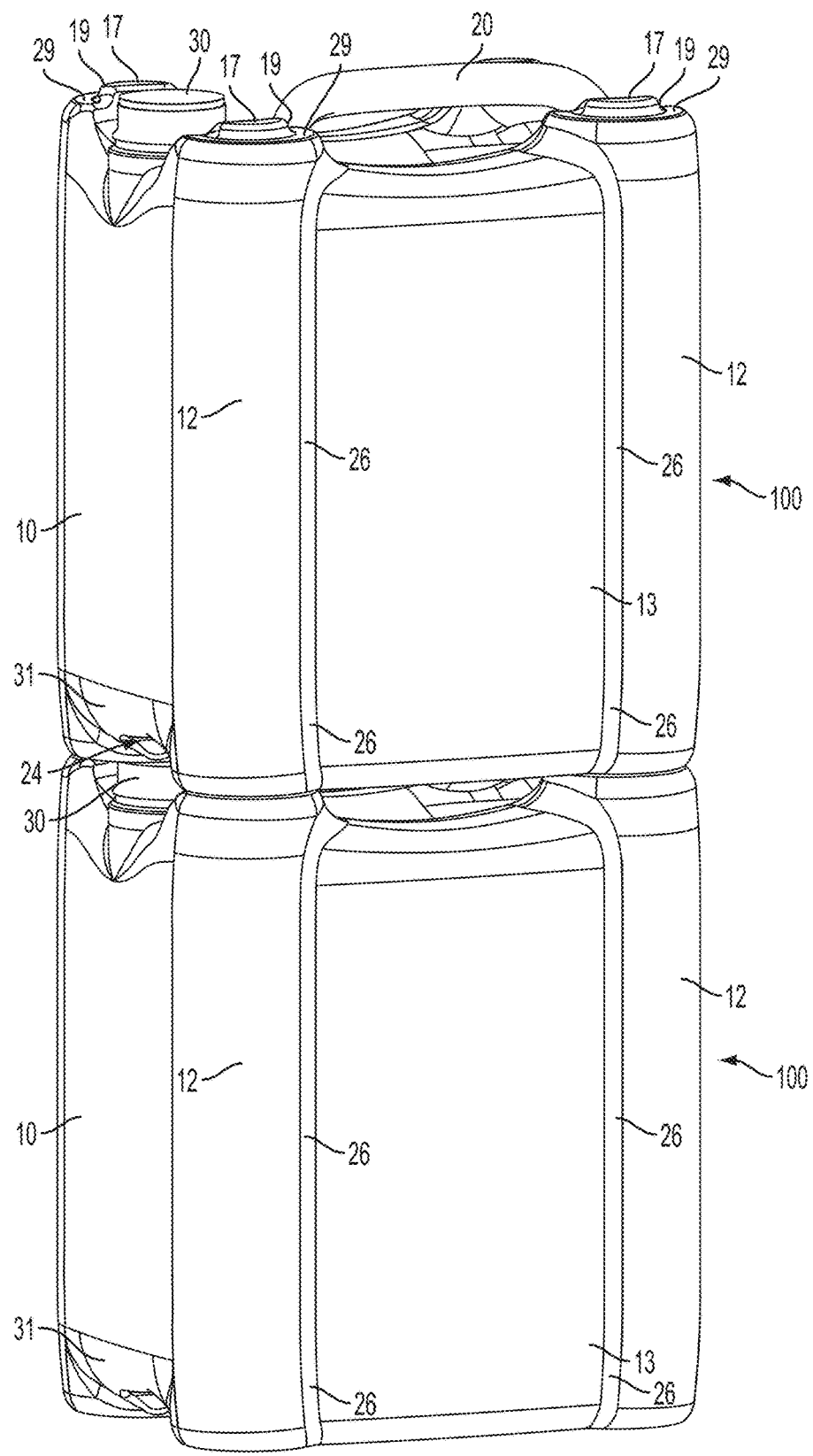
FIG. 10 is a perspective view of a number of containers of FIG. 1 stacked together according to the disclosed subject matter.
Figure 33:
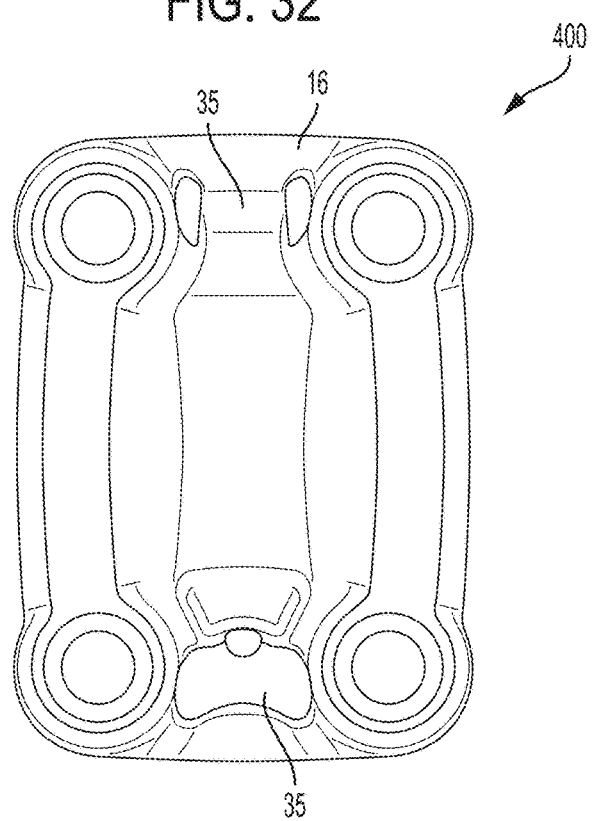
FIG. 33 is a bottom view of the container of FIG. 27.

Referring now to FIGS. 8, 10 and 15, bottom surface 16 can have a bottom support surface 21 along a bottom end of each of the first and second sidewalls. Each bottom support surface 21 can be aligned with the planar bottom surface 22 of adjacent corner column configurations 12 along the transverse direction. As embodied herein, bottom surface 16 can be raised to define a center channel 23 disposed in the longitudinal direction between the bottom support surfaces 21. Center channel 23 can have a contour configured to receive a handle portion of a similarly configured large format container in a stacked relationship, as shown in FIG. 10. Additionally or alternatively, bottom surface 16 can have a contoured surface 24 configured to receive the finish portion 30 of a substantially similar large format container in a stacked relationship in either the same or opposite orientation. As depicted in FIG. 33, bottom surface 16 can have a contoured surface 35 configured to receive the ratcheted portion 34 of finish portion 30 of container 400 in a stacked relationship in either the same or opposite orientation. Additionally or alternatively, bottom surface 16 can include a recessed hand grip feature 25, as shown, for example, in FIGS. 8 and 15.

Figure 9:
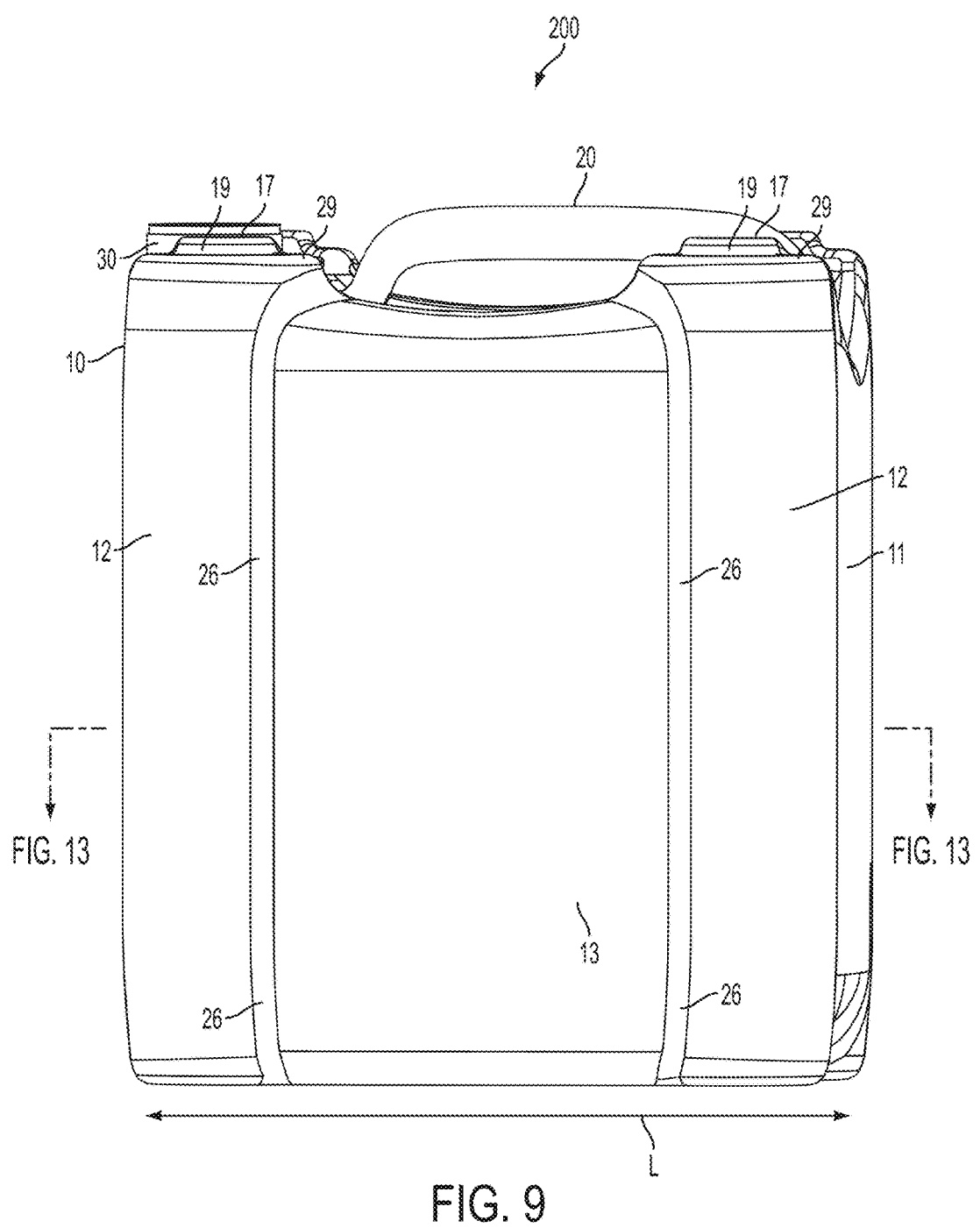
FIG. 9 is a front view of another exemplary embodiment of a container in accordance with the disclosed subject matter, illustrating a different height to length ratio than that of FIG. 1.

With reference to FIG. 4, adjacent corner column configurations 12 along the transverse direction can define the maximum width $W_{max}$ of the main body portion of container 100. The first and second sidewalls can be spaced apart in the transverse direction a width less than the maximum transverse width $W_{max}$. As embodied herein, each corner column configuration 12 has a height less than the maximum height $H_{max}$ of each corner column configuration 12. Additionally or alternatively, first sidewall 13 and second sidewall 14 can each have an overall height less than the maximum height $H_{max}$. It is to be recognized that the dimensions and relative proportions of the main body portion of container 100 will vary according to the size and intended use of the container. While an essentially rectangular container 100 is illustrated in FIGS. 1-10, one of ordinary skill in the art will recognize that the size and relative ratios of various dimensions of the container can be modified as desired. For example, FIG. 9 shows an alternative embodiment of a container 200 having sidewalls 13 and 14 and end walls 10 and 11 with a height less than the maximum height $H_{max}$ of each corner column configuration 12. As such, and as embodied herein, the ratio of the height and width of the container 200 can be the same as or different than that of container 100 of FIGS. 1-8. One of ordinary skill in the art will therefore recognize that the container can be scaled to any ratio or dimensions, for example, by making any or all of the dimensions shorter, taller, wider, narrower, etc.

In accordance with another aspect of the disclosed subject matter, a plurality of containers 100 having substantially similar configuration can be stacked together, as shown for example in FIG. 10. Any suitable number of containers can be stacked. For example, as embodied herein, four or more containers 100 can be stacked, one on top of another, to obtain a stack having four or more levels of containers in height. The corner column configurations 12 of the disclosed subject matter provide additional top load strength, for example to support containers 100 stacked thereon by distributing a portion of the weight of the stacked containers 100 among each of the corner column configurations 12. As embodied herein, the disclosed large format rigid polymer container can achieve more than 40% greater top load strength than conventional containers. For example, large format rigid polymer containers of the disclosed subject matter can exhibit top load strength of over 1220 lbs.

Figure 18B:
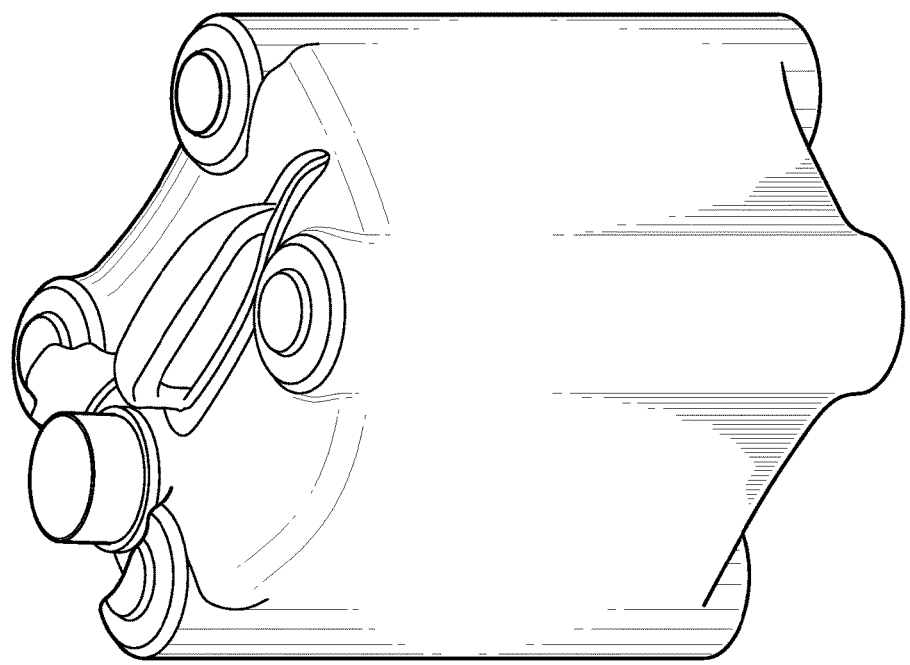
FIG. 18B is a diagram illustrating top load strength of a container according to the disclosed subject matter, side-by-side with the conventional container of FIG. 18A for purpose of comparison with and confirmation of the disclosed subject matter.
Figure 18A:
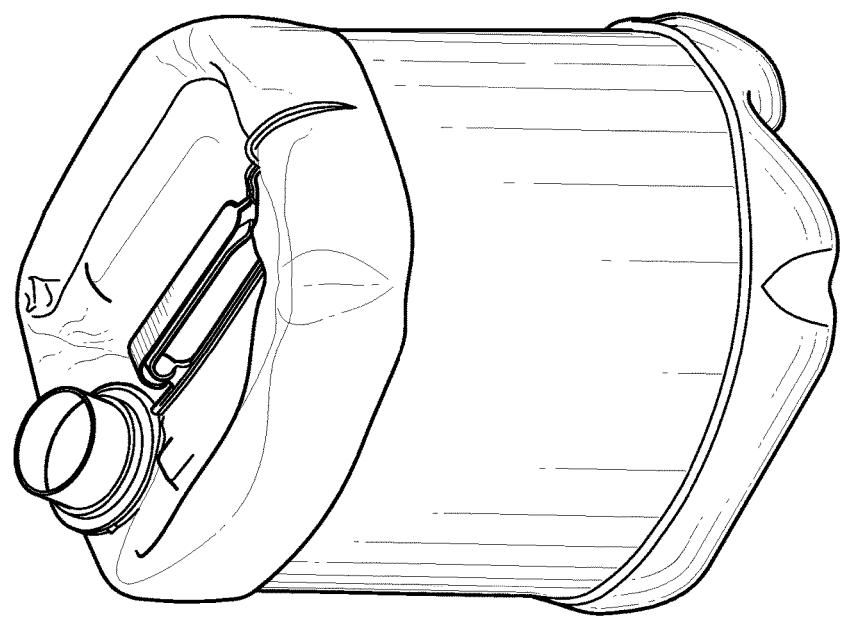
FIG. 18A is a diagram illustrating top load strength and deformation of a conventional container.

The thickness of the walls can be selected to provide a lightweight container having any desired or suitable top load to weight ratio. For purpose of illustration and not limitation, as embodied herein each wall can have a thickness of approximately 0.075-0.081 inches. For purpose of illustration and confirmation of the disclosed subject matter, FIG. 18A is a finite element analysis of a conventional container having a wall thickness of 0.081 inches. FIG. 18A illustrates deformation of the conventional container due to a virtual top load of 597 pounds. FIG. 18B, shown side-by-side with FIG. 18A for purpose of comparison, illustrates a finite element analysis of container 100 according to the disclosed subject matter and having a wall thickness of 0.081 inches. FIG. 18B illustrates that container 100 can be substantially free of deformation with a virtual load of 1152 pounds. In this manner, for purpose of illustration, container 100 can hold about twice the load of a conventional container with a similar wall thickness, and thus can support being stacked in a stacking relationship, for example in a shipping container, beneath a greater number of similarly configured containers 100.

In accordance with another aspect of the disclosed subject matter, a method of making a container 100 is provided. It will be understood that the container can be made using any suitable technique, including blow molding, thermoforming, etc. For example, the disclosed large format rigid polymer containers can be made by the methods disclosed in U.S. Pat. Nos. 8,636,944, 8,585,392, 8,632,867, 8,535,599, 8,544,663, and 8,556,621, incorporated herein by reference. The container can be made from any suitable polymeric materials, including but not limited to low and high density polyethylene, polyethylene terephthalate, polyvinyl chloride, polypropylene, polystyrene, fluorine treated high density polyethylene, post-consumer resin, K-resin, or bioplastic.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A large format container, comprising:
   a single-piece blow-molded hollow main body portion comprising:

a plurality of corner column configurations, each corner column configuration having a top end and a bottom end, the top ends of the plurality of corner column configurations defining a top reference plane and the bottom ends of the plurality of corner column configurations defining a bottom reference plane;

first and second end walls, each end wall extending between adjacent corner column configurations along a transverse direction of the main body portion;

first and second sidewalls, each sidewall extending between an adjacent pair of corner column configurations along a longitudinal direction of the main body portion;

a top surface recessed relative to the top reference plane and extending between the plurality of corner column configurations; and a raised bottom surface extending between the plurality of corner column configurations, wherein the top end of each corner column configuration has a hollow stabilizing tab in fluid communication with the hollow main body portion and the bottom end of each corner column configuration has a recess feature configured to receive the stabilizing tab of a substantially similar large format container in a stacked relationship.

2. The container of claim 1, wherein the top end of each corner column configuration has a planar top surface.

3. The container of claim 1, wherein the stabilizing tab of each corner column configuration has a tapered sidewall in side view to facilitate centering the recess feature of a substantially similar large format container in a stacked relationship.

4. The container of claim 1, wherein the stabilizing tab of each corner column configuration has a partial circular shape in plan view.

5. The container of claim 1, wherein each corner column configuration defines a partial cylindrical shape.

6. The container of claim 5, wherein each end wall extends tangentially between adjacent corner column configurations along the transverse direction.

7. The container of claim 1, wherein each end wall is planar.

8. The container of claim 1, wherein the adjacent corner column configurations along the transverse direction define a maximum width of the main body portion, and further wherein the first and second sidewalls are spaced apart in the transverse direction a width less than the maximum transverse width.

9. The container of claim 1, wherein each corner column configuration has a maximum height between the bottom end and the top end, and further wherein the first and second sidewalls each have an overall height less than the maximum height.

10. The container of claim 1, wherein each sidewall is arcuate in plan view.

11. The container of claim 1, wherein each sidewall has an arcuate top edge in side view.

12. The container of claim 1, wherein the top surface is arcuate in end view.

13. The container of claim 1, further comprising a finish portion proximate the top surface, the finish portion defining a mouth in fluid communication with an interior chamber of the main body portion, the container further comprising a hollow handle portion extending from the finish portion to the top surface of the main body portion, the handle portion defining a conduit in communication between the mouth of the finish portion and the interior chamber of the main body portion and being configured to reduce glug.

14. The container of claim 1, further comprising a finish portion proximate the top surface, the finish portion defining a mouth in fluid communication with an interior chamber of the main body portion, the container further comprising a hollow handle portion extending from the top surface of main body portion, the handle portion having a conduit defined therein isolated from the mouth of the finish portion and the interior chamber of the main body portion.

15. A stack of large format containers, each large format container comprising: a single-piece blow-molded hollow main body portion comprising:

a plurality of corner column configurations, each corner column configuration having a top end and a bottom end, the top ends of the plurality of corner column configurations defining a top reference plane and the bottom ends of the plurality of corner column configurations defining a bottom reference plane;

first and second end walls, each end wall extending between adjacent corner column configurations along a transverse direction of the main body portion;

first and second sidewalls, each sidewall extending between an adjacent pair of corner column configurations along a longitudinal direction of the main body portion;

a top surface recessed relative to the top reference plane and extending between the plurality of corner column configurations; and a raised bottom surface extending between the plurality of corner column configurations, wherein the top end of each corner column configuration has a hollow stabilizing tab in fluid communication with the hollow main body portion and the bottom end of each corner column configuration has a recess feature configured to receive the stabilizing tab of another of the large format containers in a stacked relationship.

16. A method of extrusion blow molding a large format container, comprising: extruding a parison of polymeric material;

disposing the parison in a mold cavity; and blow molding the parison in the mold cavity to form a single-piece hollow main body portion comprising:

a plurality of corner column configurations, each corner column configuration having a top end and a bottom end, the top ends of the plurality of corner column configurations defining a top reference plane and the bottom ends of the plurality of corner column configurations defining a bottom reference plane, first and second end walls, each end wall extending between adjacent corner column configurations along a transverse direction of the main body portion, first and second sidewalls, each sidewall extending between an adjacent pair of corner column configurations along a longitudinal direction of the main body portion, a top surface recessed relative to the top reference plane and extending between the plurality of corner column configurations, and a raised bottom surface extending between the plurality of corner column configurations, wherein the top end of each corner column configuration has a hollow stabilizing tab in fluid communication with the hollow main body portion and the bottom end of each corner column configuration has a recess feature configured to receive the stabilizing tab of a substantially similar large format container in a stacked relationship.

17. A large format container, comprising:
a single-piece blow-molded hollow main body portion comprising:
a plurality of corner column configurations, each corner column configuration having a top end and a bottom end, the top ends of the plurality of corner column configurations defining a top reference plane and the bottom ends of the plurality of corner column configurations defining a bottom reference plane;
first and second end walls, each end wall extending between adjacent corner column configurations along a transverse direction of the main body portion;
first and second sidewalls, each sidewall extending between an adjacent pair of corner column configurations along a longitudinal direction of the main body portion;
a top surface recessed relative to the top reference plane and extending between the plurality of corner column configurations;
a raised bottom surface extending between the plurality of corner column configurations; and
a finish portion proximate the top surface, the finish portion defining a mouth in fluid communication with an interior chamber of the main body portion, the container further comprising a hollow handle portion extending from the finish portion to the top surface of the main body portion, the handle portion defining a conduit in communication between the mouth of the finish portion and the interior chamber of the main body portion and being configured to reduce glug.

18. The container of claim 17, wherein the finish portion has a ratcheted portion proximate the top surface.

19. A large format container, comprising:
a single-piece blow-molded hollow main body portion comprising:
a plurality of corner column configurations, each corner column configuration having a top end and a bottom end, the top ends of the plurality of corner column configurations defining a top reference plane and the bottom ends of the plurality of corner column configurations defining a bottom reference plane;
first and second end walls, each end wall extending between adjacent corner column configurations along a transverse direction of the main body portion;
first and second sidewalls, each sidewall extending between an adjacent pair of corner column configurations along a longitudinal direction of the main body portion;
a top surface recessed relative to the top reference plane and extending between the plurality of corner column configurations;
a raised bottom surface extending between the plurality of corner column configurations; and
a finish portion proximate the top surface, the finish portion defining a mouth in fluid communication with an interior chamber of the main body portion, the container further comprising a hollow handle portion extending from the top surface of main body portion, the handle portion having a conduit defined therein isolated from the mouth of the finish portion and the interior chamber of the main body portion.

20. The container of claim 19, further comprising a reinforcing strut joining the top surface to the handle portion.

21. The container of claim 19, wherein the bottom end of each corner column configuration has a planar bottom surface.

22. The container of claim 21, further comprising a bottom support surface along a bottom end of each of the first and second sidewalls, each bottom support surface being aligned with the planar bottom surface of the adjacent corner column configurations along the transverse direction.

23. The container of claim 21, wherein the raised bottom surface defines a center channel disposed in the longitudinal direction between the two bottom support surfaces.

24. A large format container, comprising:
a single-piece blow-molded hollow main body portion comprising:
a plurality of corner column configurations, each corner column configuration having a top end and a bottom end, the top ends of the plurality of corner column configurations defining a top reference plane and the bottom ends of the plurality of corner column configurations having a planar bottom surface and defining a bottom reference plane;
first and second end walls, each end wall extending between adjacent corner column configurations along a transverse direction of the main body portion;
first and second sidewalls, each sidewall extending between an adjacent pair of corner column configurations along a longitudinal direction of the main body portion;
a bottom support surface along a bottom end of each of the first and second sidewalls, each bottom support surface being aligned with the planar bottom surface of the adjacent corner column configurations along the transverse direction;
a top surface recessed relative to the top reference plane and extending between the plurality of corner column configurations;
a raised bottom surface extending between the plurality of corner column configurations, wherein the raised bottom surface defines a center channel disposed in the longitudinal direction between the two bottom support surfaces.

25. The container of claim 24, wherein the raised bottom surface is contoured to receive upper features of a substantially similar large format container in a stacked relationship in either a same or opposite orientation.

26. The container of claim 25, wherein the raised bottom surface further comprises a recessed hand grip feature.

27. The container of claim 26, further comprising a reinforced seam defined along the raised bottom surface.

* * * * *